United States Patent
Miura et al.

(10) Patent No.: US 8,374,132 B2
(45) Date of Patent: Feb. 12, 2013

(54) BASE STATION DEVICE, METHOD FOR CONTROLLING BASE STATION DEVICE, RECEIVING DEVICE, ADAPTATION ALGORITHM CONTROL METHOD, RADIO COMMUNICATION DEVICE, AND RADIO COMMUNICATION METHOD

(75) Inventors: Takanori Miura, Yokohama (JP); Takehiro Hara, Yokohama (JP); Toru Sahara, Yokohama (JP)

(73) Assignee: Kyocera Corporation, Kyoto (JP)

( * ) Notice: Subject to any disclaimer, the term of this patent is extended or adjusted under 35 U.S.C. 154(b) by 819 days.

(21) Appl. No.: 12/302,718

(22) PCT Filed: May 28, 2007

(86) PCT No.: PCT/JP2007/060818
§ 371 (c)(1),
(2), (4) Date: Sep. 16, 2009

(87) PCT Pub. No.: WO2007/139063
PCT Pub. Date: Dec. 6, 2007

(65) Prior Publication Data
US 2010/0157909 A1    Jun. 24, 2010

(30) Foreign Application Priority Data

May 29, 2006 (JP) .................. 2006-148720
May 29, 2006 (JP) .................. 2006-148839
Jul. 28, 2006 (JP) .................. 2006-206018

(51) Int. Cl.
H04W 4/00 (2009.01)
(52) U.S. Cl. ...................................... 370/329
(58) Field of Classification Search ............. 370/329
See application file for complete search history.

(56) References Cited

U.S. PATENT DOCUMENTS
(Continued)

FOREIGN PATENT DOCUMENTS

| JP | 07-297733 | 11/1995 |
| JP | 09-205316 | 8/1997 |

(Continued)

OTHER PUBLICATIONS

Nishimori et al., "Smart Antenna Reducing the Co-channel Interference for Microcell Systems" NTT R&D, vol. 51, No. 6, pp. 454-461, 2002 (with English abstract).

(Continued)

Primary Examiner — Derrick Ferris
Assistant Examiner — Majid Esmaeilian
(74) Attorney, Agent, or Firm — DLA Piper LLP (US)

(57) ABSTRACT

A base station device according to the present invention includes: a first reception weight calculator 122 configured to calculate weight of each antenna element of an array antenna 114 to be used in communications with a first mobile station device by using a reference signal transmitted from the first mobile station device; and a second reception weight calculator 124 configured to calculate weight of each antenna element of the array antenna 114 to be used in communications with a second mobile station device, which is different from, the first mobile station device of the multiple mobile station devices, the second reception weight calculator 124 calculating the weight so that null can be directed to an arriving direction of the reference signal transmitted from the first mobile station device, the arriving direction being determined on the basis of weight calculated by the first reception weight calculator 122.

14 Claims, 13 Drawing Sheets

U.S. PATENT DOCUMENTS

| | | | | |
|---|---|---|---|---|
| 5,524,023 | A | 6/1996 | Tsujimoto | 375/232 |
| 5,982,825 | A * | 11/1999 | Tsujimoto | 375/347 |
| 6,728,294 | B1 * | 4/2004 | Kohno et al. | 375/133 |
| 2001/0020918 | A1 | 9/2001 | Takai | 343/729 |
| 2002/0136179 | A1 | 9/2002 | Aoyama et al. | 370/335 |
| 2004/0022205 | A1 * | 2/2004 | Miyata et al. | 370/319 |
| 2006/0084404 | A1 * | 4/2006 | Laroia et al. | 455/266 |

FOREIGN PATENT DOCUMENTS

| | | |
|---|---|---|
| JP | 11-234197 | 8/1999 |
| JP | 2001-127681 | 5/2001 |
| JP | 2001-223516 | 8/2001 |
| JP | 2001-326594 | 11/2001 |
| JP | 2002-050988 | 2/2002 |
| JP | 2002-290299 | 10/2002 |
| JP | 2005-269026 | 9/2005 |

OTHER PUBLICATIONS

Japanese Language office action dated Aug. 23, 2011 and its English language translation for corresponding Japanese application 2006148720.

Japanese language office action dated Aug. 30, 2011 and its English language translation for corresponding Japanese application 2006148839.

Chinese language office action dated Dec. 23, 2011 and its English language translation issued in corresponding Chinese application 2007800198471.2.

* cited by examiner

BASE STATION DEVICE, METHOD FOR CONTROLLING BASE STATION DEVICE, RECEIVING DEVICE, ADAPTATION ALGORITHM CONTROL METHOD, RADIO COMMUNICATION DEVICE, AND RADIO COMMUNICATION METHOD

TECHNICAL FIELD

The present invention relates to an adaptive array technology using an array antenna formed of multiple antenna elements. Particularly, the present invention relates to a base station device to which the adaptive array technology is applied, a method for controlling the base station device, a receiving device, an adaptation algorithm control method, a radio communication device, and a radio communication method.

BACKGROUND ART

According to the adaptive array technology, a beam can be directed to a user of a desired wave (beam forming) and a null can be directed to a user of an interference wave (null steering), by appropriately setting weight of each antenna element of an array antenna.

Space-Division Multiple Access (SDMA) scheme has been known, as a multiplexing scheme that utilizes the adaptive array technology. In a mobile communication system that employs the SDMA, a base station device can communicate with each of multiple mobile station devices spatially separated from one another at the same timing by using a common frequency.

As a weight calculation algorithm that calculates weight of each antenna element of an array antenna, there is a weight calculation algorithm that directs a beam to the arriving direction of a known reference signal as well as directs a null to the arriving direction of a signal having low correlation with the reference signal. Besides, there is also a weight calculation algorithm that directs a null to any direction.

In general, when a radio signal is received with an array antenna, the more the number of antenna elements is, the better the receiving quality is. This is because, in array antennas, as the number of antenna elements increases, degrees of freedom in array weight calculation increase, thus making it possible to cope with a complicated propagation environment.

In array antennas, radio signals are received utilizing a predetermined adaptation algorithm. There are various kinds of adaptation algorithms. As a typical adaptation algorithm, there are an adaptation algorithm that optimizes reception of a desired wave by utilizing a known signal (herein referred to as a desired wave optimizing type adaptation algorithm) and an adaptation algorithm that suppresses a spatial component forming a receiving wave depending on its power (herein referred to as a spatial component suppressing type adaptation algorithm).

A specific example of the desired wave optimizing type adaptation algorithm includes MMSE (Minimum Mean Square Error). In addition, a specific example of the spatial component suppressing type adaptation algorithm includes PI (Power Inversion).

Meanwhile, Japanese Patent Application Publication No. 09-205316 discloses a technique in which multiple desired wave optimizing type adaptation algorithms are used while being switched.

In addition, in a diversity technology that is a technology designed to improve communication characteristics, a transmitting side transmits the same data pieces through multiple different communication channels. A receiving side selects or synthesizes received signals received through the multiple communication channels.

A diversity technology that uses different carrier frequencies is referred to as frequency diversity. Meanwhile, a diversity technology that uses different time division slots (hereinafter simply referred to as slots) according to Time Division Multiple Access/Time Division Duplication (TDMA/TDD) scheme is referred to as slot diversity.

Heretofore, there is disclosed a radio communication device that further improves communication characteristics by using the adaptive array technology in addition to the diversity technology (Japanese Patent No. 3579363, for example). However, a gain improvement function and an interference suppression function of the adaptive array technology are in a trade-off relationship with each other. If a priority is given to gain improvement, the effect of interference suppression is reduced, while if a priority is given to interference wave suppression, the gain is reduced. In essence, the gain improvement effect and the interference suppression effect cannot be achieved simultaneously.

Meanwhile, Japanese Patent Application Publication No. 2001-127681 discloses a technique related to an adaptive array base station, which diversity-transmits notification data or paging data so that peak transmission patterns of multiple different emission patterns may have a shape close to omni. This technique is a technique for improving a connection rate of incoming calls of mobile stations, and not a technique for improving communication characteristics by the gain improvement function or the interference suppression function of the adaptive array technology.

DISCLOSURE OF THE INVENTION

However, the weight calculation algorithms described above have the following problem. To be specific, when a difference in reception power among reference signals transmitted by multiple mobile station devices, which are targets for multiplexing communications, is large, a base station device cannot suitably calculate weight of each antenna element of an array antenna.

For example, when directing a beam to the arriving direction of a first reference signal of high radio field strength, a base station device has difficulty in appropriately directing a null to the arriving direction of a second reference signal that has relatively lower reception power than the first reference signal, that is, has low correlation with the first reference signal. In this case, quality of communications between the base station device and a mobile station device transmitting the second reference signal deteriorates due to influence of communications with a mobile station device transmitting the first reference signal.

Further, the adaptation algorithms described above have the following problem. To be specific, if a receiving wave contains an interference wave of strong input, the desired wave optimizing type adaptation algorithm may not be able to appropriately optimize a desired wave. In contrast, as the spatial component suppressing type adaptation algorithm simply suppresses spatial components according to power of spatial components rather than optimizing a desired wave, it may suppress the desired wave. In this way, the desired wave optimizing type adaptation algorithm and the spatial component suppressing type adaptation algorithm have disadvantages, respectively.

In addition, if the adaptive array technology described above is used in a mobile communication system, control of directional patterns cannot follow movement of mobile station devices. Accordingly, sufficient gain improvement effect or interference suppression effect cannot be obtained and thus reception characteristics may deteriorate in some cases. In addition, if the direction of a preferred wave is in proximity to that of an interference wave seen from a radio communication device, a directional pattern in which a main beam direction is separated from a null point direction cannot be formed. Thus, extraction of a preferred signal and suppression of an interference signal may not function adequately. Furthermore, if the adaptive array process is performed on a received signal of low noise level, the reception characteristics may deteriorate even more.

A radio communication device described in the above U.S. Pat. No. 3,579,363 calculates weight information on each of multiple slots related to the slot diversity reception by the same algorithm. Thus, if the reception characteristics deteriorate due to any of the causes described above, sufficient adaptive array effect cannot be obtained in any slot related to the slot diversity reception. Consequently, in some cases, the reception characteristics may not improve sufficiently even if the slot diversity reception is performed.

Hence, the present invention has been made in light of the above problems. A first object of the present invention is to provide a base station device that is capable of suitably determining weight of array antennas related to multiple mobile station devices even if a difference in reception power among reference signals transmitted by the mobile station devices is large, and thereby achieving good communications, and a method for controlling the base station device.

Further, a second object of the present invention is to provide a receiving device and an adaptation algorithm control method that enable a combined use of the desired wave optimising type adaptation algorithm and the spatial component suppressing type adaptation algorithm while making up for the disadvantages of the desired wave optimizing type adaptation algorithm and the spatial component suppressing type adaptation algorithm.

Furthermore, a third object of the present invention is to provide a radio communication device and a radio communication method that can further enhance the effect of improving communication characteristics by the diversity communication.

In order to achieve the above first object, a base station device according to the present invention is one which includes an array antenna, and which communicates with a plurality of mobile station devices including a first mobile station device and a second mobile station device in accordance with Space-Division Multiple Access scheme that uses the array antenna, the base station device comprising: a first weight calculator configured to calculate weight of each antenna element of the array antenna to be used in communications with the first mobile station device, by using a reference signal transmitted from the first mobile station device; and a second weight calculator configured to calculate weight of each antenna element of the array antenna to be used in communications with the second mobile station device, so that null is directed to an arriving direction of the reference signal transmitted from the first mobile station device, wherein the second weight calculator determines the arriving direction of the reference signal transmitted from the first mobile station device on the basis of the weight calculated by the first weight calculator.

According to such the base station device, as the arriving direction of a reference signal to be transmitted from the first mobile station device can be determined on the basis of weight to be used in communications with the first mobile station device, as well as weight to be used in communications with the second mobile station device can be calculated so that a null can be directed to that direction, mutual interference in communications with the first and the second mobile station devices, respectively, can be reduced. Consequently, even when a difference in reception power of reference signals to be transmitted from the multiple mobile station devices is large and thus calculation of weight using a reference signal to be transmitted from each of the mobile station devices cannot be performed preferably, the base station device can communicate with those mobile station devices well.

The above base station device may further comprise a reception power acquisition unit configured to acquire reception power of a signal transmitted from each of the mobile station devices; and a mobile station device selector configured to select the first mobile station device and the second mobile station device on the basis of each of the reception power acquired by the reception power acquisition unit.

In addition, the above base station device may further comprise a third weight calculator configured to calculate weight of each antenna element of the array antenna to be used in communications with the second mobile station device by using a reference signal transmitted from the second mobile station device, wherein the base station device may communicate with the second mobile station device by using weight calculated by the third weight calculator instead of weight calculated by the second weight calculator, in accordance with quality of communications with the second mobile station device using the weight calculated by the second weight calculator.

In addition, a method for controlling a base station device according to the present invention is one for controlling a base station device which includes an array antenna, and which communicates with a plurality of mobile station devices including a first mobile station device and a second mobile station device in accordance with Space-Division Multiple Access scheme that uses the array antenna, the method comprising: a first weight calculation step of calculating weight of each antenna element of the array antenna to be used in communications with the first mobile station device by using a reference signal transmitted from the first mobile station device, and a second weight calculation step of calculating weight of each antenna element of the array antenna to be used in communications with the second mobile station device, the weight being calculated so that null is directed to an arriving direction of the reference signal transmitted from the first mobile station device, wherein the arriving direction of the reference signal transmitted from the first mobile station device is determined in the second weight calculation step on the basis of the weight calculated in the first weight calculation step.

In order to achieve the above second object, a receiving device according to the present invention is one including an array antenna formed of a plurality of antenna elements, the device comprising: an adaptive controller configured to adaptively control a receiving wave arriving at each of the antenna elements by using a desired wave optimizing type adaptation algorithm as an adaptation algorithm, the desired wave optimizing type adaptation algorithm optimizing reception of a desired wave by utilizing a known signal; a desired wave power information acquisition unit configured to acquire desired wave power information indicating a power level of a desired wave from the receiving wave; an undesired wave power information acquisition unit configured to acquire undesired wave power information indicating a power level of an undesired wave contained in the receiving wave; and a used adaptation algorithm changing unit configured to change the adaptation algorithm used by the adaptive controller to a spatial component suppressing type adaptation algorithm in accordance with the undesired wave power information and the desired wave power information, the spatial component suppressing type adaptation algorithm suppressing a spatial component forming the receiving wave in accordance with power of the spatial component.

According to such the receiving device, the desired wave optimizing type adaptation algorithm and the spatial component suppressing type adaptation algorithm can be used in combination, while making up for the respective disadvantages of the desired wave optimizing type adaptation algorithm and the spatial component suppressing type adaptation algorithm.

In addition, in the above receiving device, the desired wave power information acquisition unit may acquire the desired wave power information by using a desired wave optimized by the desired wave optimizing type adaptation algorithm.

This enables the power level of a desired wave optimized by the desired wave optimizing type adaptation algorithm to be used as desired wave power information.

In addition, in the above receiving device, the desired wave power information acquisition unit may acquire the desired wave power information by using the receiving wave arriving at each of the antenna elements.

This enables desired wave power information to be acquired irrespective of whether or not the desired wave optimizing type adaptation algorithm performs adaptive control.

In addition, in each of the above receiving devices, the spatial component suppressing type adaptation algorithm is an adaptation algorithm that suppresses a spatial component with the largest power, among spatial components forming the receiving wave, and when a ratio of a power level indicated by the undesired wave power information to a power level indicated by the desired wave power information is greater than a predetermined value, the used adaptation algorithm changing unit may cause the adaptive controller to use the spatial component suppressing type adaptation algorithm.

This also enables a combined use of the desired wave optimizing type adaptation algorithm and the spatial component suppressing type adaptation algorithm, while making up for respective disadvantages thereof.

Furthermore, in the above receiving device, the spatial component suppressing type adaptation algorithm is an adaptation algorithm that suppresses spatial components in descending order of power among spatial components forming the receiving wave, the number of the spatial components corresponding to the number of the antenna elements that receive the receiving wave, and the receiving device may further include an antenna element number controller configured to control the number of the antenna elements that receive the receiving wave, depending on whether the adaptive controller uses the spatial component suppressing type adaptation algorithm.

This can prevent a desired wave from being suppressed even when the spatial component suppressing type adaptation algorithm that suppresses spatial components corresponding to the number of antenna elements is used.

In addition, an adaptation algorithm control method according to the present invention is one for controlling an adaptation algorithm to be used in a receiving device including an array antenna formed of a plurality of antenna elements, the method comprising: an adaptive control step of adaptively controlling a receiving wave arriving at each of the antenna elements by using a desired wave optimizing type adaptation algorithm that utilizes a known signal to optimize reception of a desired wave; a desired wave power information acquisition step of acquiring desired wave power information indicating a power level of a desired wave from the receiving wave; an undesired wave power information acquisition step of acquiring undesired wave power information indicating a power level of an undesired wave contained in the receiving wave; and a used adaptation algorithm changing step of changing an adaptation algorithm used in the adaptive control step to a spatial component suppressing type adaptation algorithm that suppresses a spatial component forming the receiving wave in accordance with power of the spatial component, the adaptation algorithm being changed depending on the undesired wave power information and the desired wave power information.

In order to achieve the above third object, a radio communication device according to the present invention is one which includes an array antenna, which communicates with a plurality of mobile station devices by using the array antenna, and which assigns a plurality of communication channels respectively to at least some of the mobile station devices so that identical data pieces transmitted from the mobile station devices are respectively received at the plurality of communication channels, the device comprising: a communication quality comparator configured to compare communication quality of a signal received in each of the communication channels of the plurality of communication channels; a weight information calculator configured to calculate weight information of each antenna element of the array antenna for some of the plurality of communication channels, the weight information being calculated by using a different algorithm from an algorithm used for other communication channels and on the basis of a comparison result by the communication quality comparator; and a weighting unit configured to weight at least one of a transmitting signal and a received signal at each of the plurality of communication channels, on the basis of the weight information of each antenna calculated by the weight information calculator.

The radio communication device compares communication quality of a received signal in each of the communication channels of the multiple communication channels to be used in diversity communications with mobile station devices. Then, on the basis of the comparison result, it calculates weight information of each antenna for a part of communication channels of the multiple communication channels by using an algorithm different from an algorithm to be used for other communication channels.

According to such the radio communication device, at least one of a transmitting signal or a received signal in each of the multiple communication channels related to diversity communications can be weighted by using not less than two algorithms having different effect, and thus a signal having better communication characteristics of the multiple weighted signals can be selected. Consequently, the effect of improving the communication characteristics in the diversity communications can be further enhanced.

In the above radio communication device, the weight information calculator may calculate weight information of each of the antennas for some communication channels that are determined to have good communication quality by the communication quality comparator among the plurality of communication channels, the weight information being calculated by using a gain prioritized algorithm.

This enables weighting of transmitting signals and/or received signals in a part of communication channels that have less interference noise of the multiple communication channels related to diversity communications by using the gain prioritized algorithm, and weighting of signals in other communication channels by using an interference suppression prioritized algorithm, respectively. Consequently, a signal having better communication characteristics can be selected from the signals that are transmitting signals and/or received signals containing the same data, respectively, weighted by using the gain prioritized algorithm and the interference suppression prioritized algorithm that are in a trade-off relationship.

In addition, in the above radio communication device, the communication channels may be formed of transmission channels and reception channels that use the same carrier frequency. This enables the effect of improving communication characteristics to be further enhanced in communications that use the frequency diversity.

In addition, in one aspect of the present invention, the radio communication device communicates with the plurality of mobile station devices in accordance with the Time Division Multiple Access scheme, and the communication channels are formed of transmission channels and reception channels that use different time division slots. This enables the effect of improving the communication characteristics to be further enhanced in communications that uses the slot diversity.

In addition, a radio communication method according to the present invention is one for communicating with a plurality of mobile station devices by using an array antenna, and assigning a plurality of communication channels respectively to at least some of the mobile station devices so that identical data pieces transmitted from the mobile station devices are respectively received at the plurality of communication channels, the method comprising: a communication quality comparison step of comparing communication quality of a signal received in each of the communication channels of the plurality of communication channels: a weight information calculation step of calculating weight information of each antenna element of the array antenna for some of the plurality of communication channels, the weight information being calculated by using a different algorithm from an algorithm used for other communication channels and on the basis of a comparison result in the communication quality comparison step; and a weighting step of weighing at least one of a transmitting signal and a received signal at each of the plurality of communication channels, on the basis of the weight information of each antenna calculated in the weight information calculation step.

BEST MODES FOR CARRYING OUT THE INVENTION

[First Embodiment]

A first embodiment of the present invention will be described below on the basis of the drawings.

(Overall Configuration of Mobile Communication System)

Figure 1:
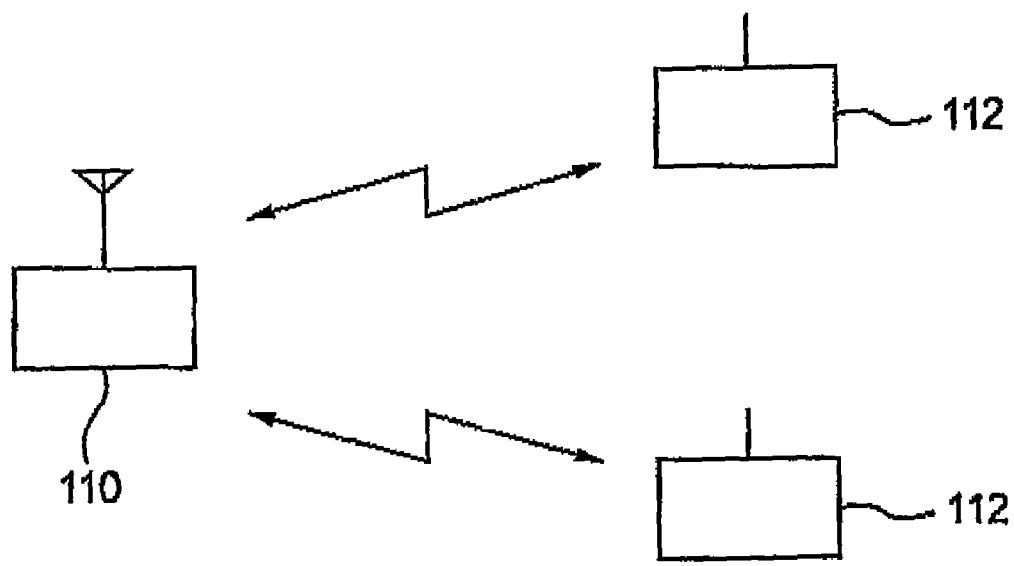
FIG. 1 is an overall configuration diagram of a mobile communication, system according to a first embodiment of the present invention.

FIG. 1 is an overall configuration diagram of a mobile communication system according to a first embodiment of the present invention. As shown in FIG. 1, the mobile communication system includes a base station device 110 and multiple mobile station devices 112 (2 in this embodiment). Each of the mobile station devices 112 is a portable phone or a data terminal, for example, and wirelessly communicates with the base station device 110. Here, the base station device 110 and each of the mobile station devices 112 transmit and receive data by using the TDD (Time Divisional Duplication) scheme and perform multiplex communications by using the TDMA (Time Division Multiple Access) scheme.

Further, the base station device 110 includes array antennas as described below, and performs multiplex communications with each of the mobile station devices 112 by using the array antennas through the Space-Division Multiple Access (SDMA) scheme. The base station device 10 performs bidirectional communications with the multiple mobile station devices 112 with extremely high frequency utilization efficiency.

(Configuration of Base Station Device)

Figure 2:
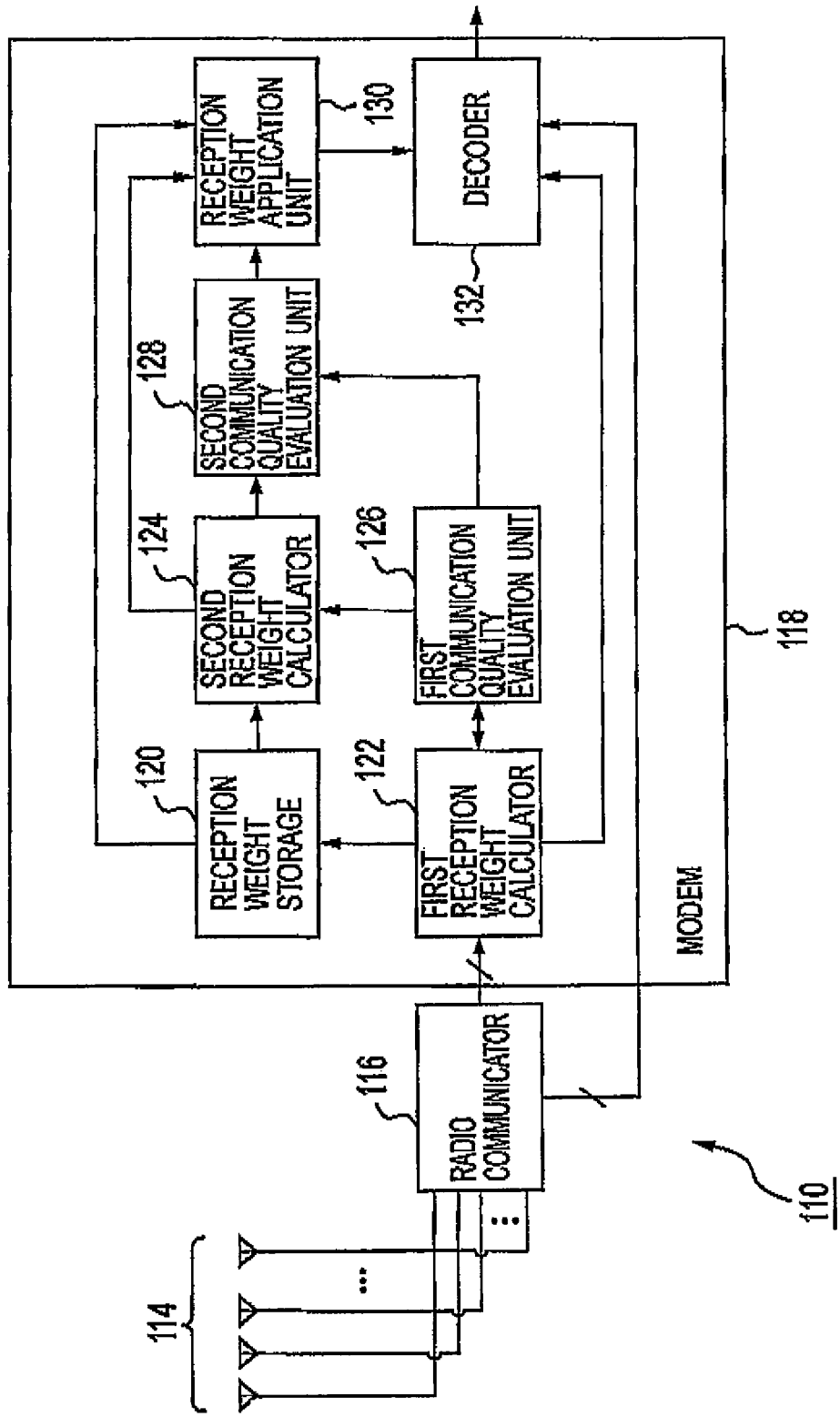
FIG. 2 is a block diagram showing a configuration of a base station device according to the first embodiment of the present invention.

FIG. 2 is a configuration, diagram of the base station device 110. As shown in FIG. 2, the base station device 110 includes an array antenna 114, a radio communicator 116, and a modem 118. The array antenna 114 is an array of multiple antennas. The array antenna 114 emits transmitting signals to be supplied to each antenna element from the radio communicator 116. Alternatively, the array antenna 114 receives signals transmitted from the respective mobile station devices 112 at each antenna element, and inputs the received signals into the radio communicator 116.

The radio communicator 116 includes a PA (Power Amp) unit, an RF (Radio Frequency) unit, and a BB (Base Band)

unit. The radio communicator 116 converts signals received by the array antenna 114 into base band received signals, and supplies the base band received signals to the modem 118. In addition, the radio communicator 116 converts base band transmitting signals of the respective antennas to be inputted from the modem 118 into radio signals, and supplies the radio signals to the array antenna 114.

The modem 118 decodes data transmitted from the mobile station devices 112, from the transmitting signal of each antenna element to be outputted from the radio communicator 116. In addition, the modem 118 converts data to be transmitted to each of the mobile station devices 112 into base band transmitting signals for the respective antenna elements, and inputs the base band transmitting signals into the radio communicator 116. The base station device 110 includes an upper layer device (not shown) that processes data to be transmitted and received.

The modem 118 more specifically includes: a reception weight storage 120; a first reception weight calculator 122; a second reception weight calculator 124; a first communication quality evaluation unit 126; a second communication quality evaluation unit 128; a reception weight application unit 130; and a decoder 132. These components are implemented by a high-performance computer and its control software, for example.

The first reception weight calculator 122 calculates weight of the array antenna 114 to be used in communications with each of the mobile station devices 112, on the basis of a base band received signal to be outputted from the radio communicator 116 and a known reference signal. To be specific, the first reception weight calculator 122 calculates weight of the array antenna 114 to be used in communications with the mobile station devices 112 so that a beam can be formed in the arriving direction of a reference signal corresponding to each of the mobile station devices 112, as well as that a null can be directed to the arriving direction of a signal having low correlation with a reference signal (interference signal).

In the following, an algorithm that calculates weight according to correlation between a reference signal and a received signal is referred to as an algorithm 1. Among weight to be calculated by the first reception weight calculator 122, the weight to be used in communications with the mobile station device 112 (device A) having greater reception power of a reference signal is supplied to the decoder 132. In contrast, the weight to be used in communications with the mobile station device 112 (device B) having smaller reception power of a reference signal is supplied to the first communication quality evaluation unit 126. In addition, any weight is supplied to the reception weight storage 120. In response to an instruction from the first communication quality evaluation unit 126, the first reception weight calculator 122 also supplies the weight to be used in communications with the mobile station device 112 (device B) having smaller reception power of a reference signal to the decoder 132.

The reception weight storage 120 includes a memory and stores the weight which is to be calculated, by the first reception weight calculator 122 and is related to each of the mobile station devices 112.

The first communication quality evaluation unit 126 calculates signal quality (SINR) in communications with the mobile station device 112 (device B), on the basis of the weight to be supplied from the first reception weight calculator 122 and to be used in communications with the mobile station device 112 (device B) having smaller reception power of a reference signal. If the signal quality thus calculated does not satisfy a predetermined reference, the first communication quality evaluation unit 126 instructs the second reception weight calculator 124 to re-calculate weight to be used in communications with the mobile station device (device B) having smaller reception power of a reference signal, by using an algorithm different from the above algorithm 1 (hereinafter referred to as an algorithm 2).

From the reception weight storage 120, the second reception weight calculator 124 reads out the weight to be used in communications with the mobile station device 112 (device A) having greater reception power of a reference signal. On the basis of the weight thus read out, the second reception weight calculator 124 determines the arriving direction of a reference signal from the device A, as well as calculates weight (algorithm 2) to be used in communications with the mobile station device 112 (device B) having smaller reception power of a reference signal so that a null can be directed to the arriving direction.

On the basis of the weight to be supplied from the second reception weight calculator 124, the second communication quality evaluation unit 128 calculates signal quality (SINR) in communications with the mobile station device 112 (device B) having smaller reception power of a reference signal. Then, the second communication quality evaluation unit 128 compares the signal quality thus calculated (corresponding to weight by the algorithm 2) with the signal quality calculated by the first communication quality evaluation unit 126 (corresponding to weight by the algorithm 1). Then, the second communication quality evaluation, unit 128 instructs the reception weight application unit 130 to apply the weight calculated by an algorithm corresponding to either the algorithm 1 or the algorithm 2 that has higher signal quality.

In accordance with the instruction from the second communication quality evaluation unit 128, the reception weight application unit 130 supplies, to the decoder 132, either the weight stored in the reception weight storage 120 (one calculated with the algorithm 1) or the algorithm calculated by the second reception weight calculator 124 with the algorithm 2, as weight to be used in communications with the mobile station device 112 (device B) having smaller reception power of a reference signal.

Using the weight calculated by the first reception weight calculator 122, the decoder 132 synthesizes a base band signal received from, the mobile station device 112 (device A) having greater reception power of a reference signal, and decodes the transmission data. The decoder 132 also synthesizes a base band signal received from the motile station device 112 (device B) having smaller reception power of a reference signal using the weight supplied from the reception weight application unit 130 or the weight supplied from the first reception weight calculator 122, and decodes the transmission data. Then, each of the decoded transmission data pieces is supplied to an upper layer device (not shown).

(Operation of Base Station Device)

Figure 3:
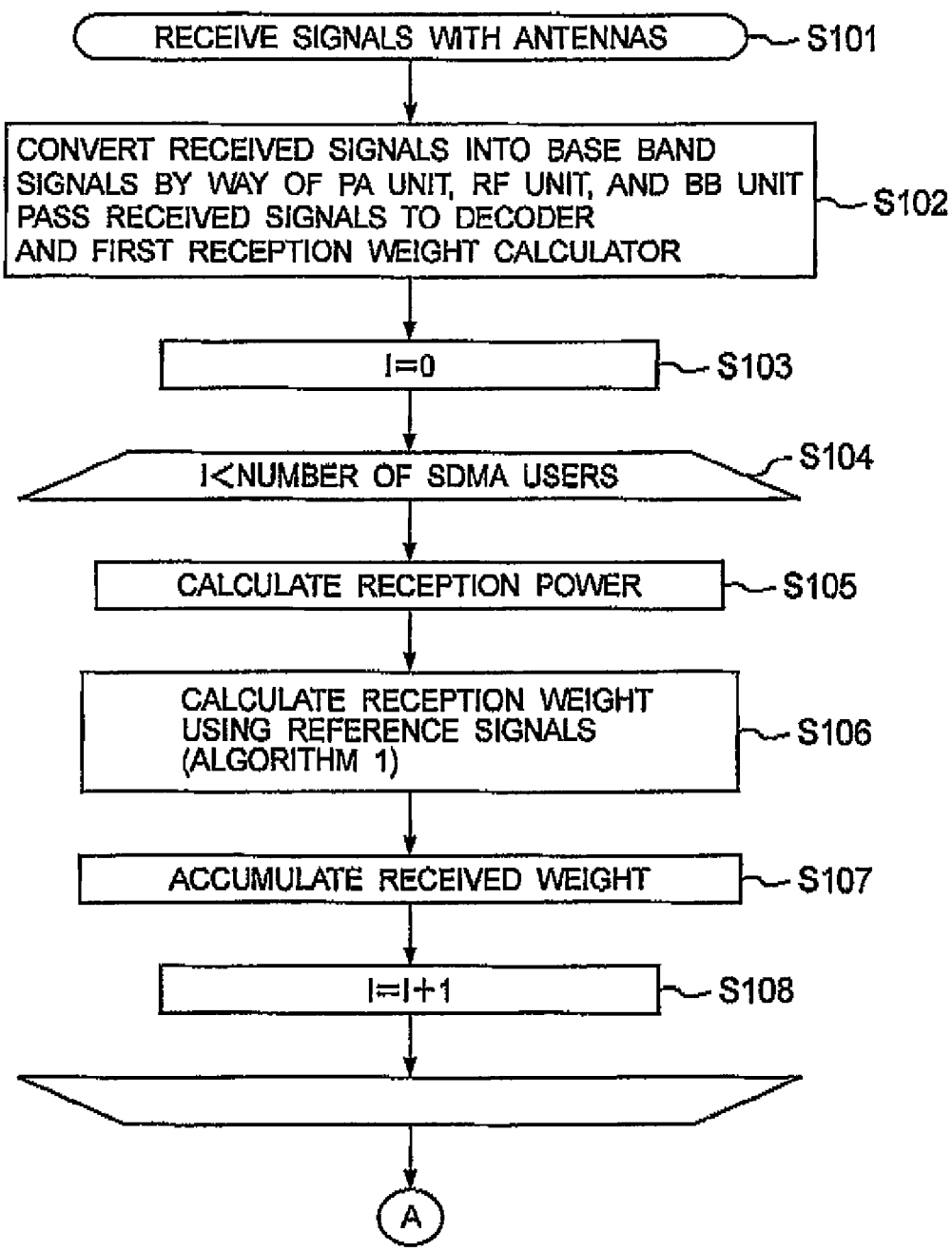
FIG. 3 is a flowchart showing a receiving operation of the base station device according to the first embodiment of the present invention.
Figure 4:
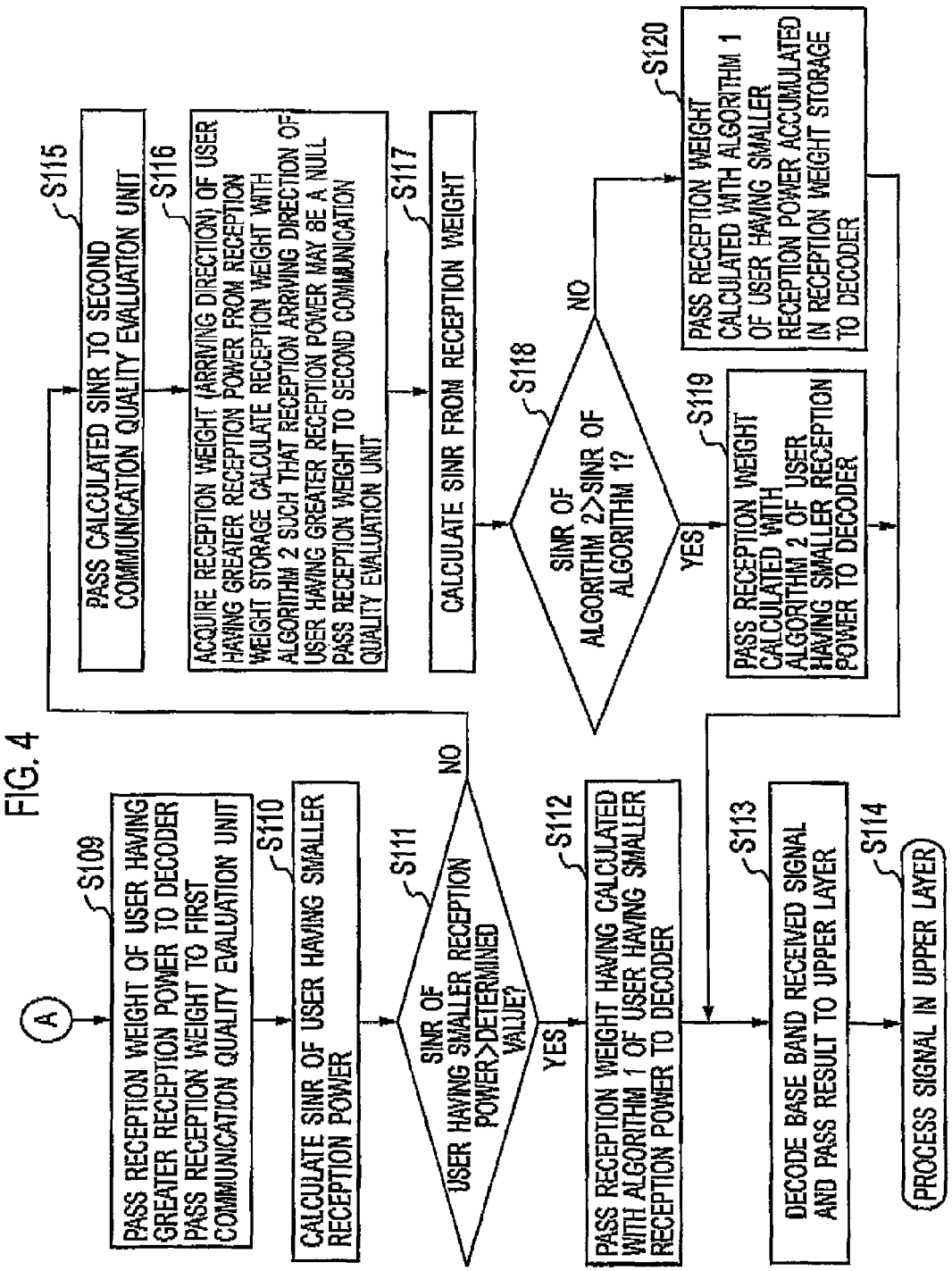
FIG. 4 is a flowchart showing a receiving operation of the base station device according to the first embodiment of the present invention.

Here, the operation of the base station device 110 will be described. FIG. 3 and FIG. 4 are flow charts of the reception operation of the base station device 110.

As shown in FIG. 3 and FIG. 4, in the base station device 110, the array antenna 114 first receives signals from the respective mobile station devices 112 (S101). The radio communicator 116 converts the signals received from the respective mobile station devices 112 into base band signals (S102).

The first reception weight calculator 122 sets a variable I, which identifies the mobile station device 112, to value 0 (S103), and calculates reception power of a reference signal transmitted from the mobile station device 112 that is identified by the variable I (S105).

In addition, on the basis of a reference signal transmitted from the mobile station device 112 that is identified by the variable I, the first reception weight calculator 122 calculates weight so that a beam can be directed to the arriving direction of a reference signal (S106). Then, the first reception weight calculator 122 stores the calculated weight in the reception weight storage 120 (S107). The above processes (S105 to S107) are performed on all the mobile station devices 112, while incrementing the variable I by one.

Then, the first reception weight calculator 122 supplies the reception weight of the mobile station device 112 (device A) having greater reception power of a reference signal to the decoder 132. In addition, the first reception weight calculator 122 supplies the reception weight of the mobile station device 112 (device B) having smaller reception power of a reference signal to the first communication quality evaluation unit 126 (S109). Then, the first communication quality evaluation unit 126 calculates communication quality (SINR) with the device B on the basis of the weight of the device B (S110).

Next, the first communication quality evaluation unit 126 determines whether or not the calculated SINK exceeds a predetermined threshold (S111). Then, if the calculated SINR exceeds the predetermined threshold, the first communication quality evaluation unit 126 instructs the first reception weight calculator 122 to supply the weight of the mobile station device 112 (device B) having smaller reception power of a reference signal to the decoder 132. Upon receipt of the instruction from the first communication quality evaluation unit 126, the first reception weight calculator 122 supplies the weight of the device B to the decoder 132 (S112). Using the weight thus supplied, the decoder 132 decodes data transmitted from the devices A and B (S113).

On the one hand, if it is determined that the SINR calculated in S110 is the predetermined value or smaller, the first communication quality evaluation unit 126 instructs the second reception weight calculator 124 to re-calculate the weight, as well as passes the calculated SINR to the second communication, quality evaluation unit 128 (S115).

The second reception weight calculator 124 reads out the weight of the mobile station device 112 (device A) having greater reception power of a reference signal from the reception weight storage 120, and determines, from the weight thus read out, the arriving direction of a reference signal from the device A. Then, the weight of the array antenna 114 is calculated so that a null can be directed to the arriving direction of a reference signal from the device A (S116).

On the basis of the weight calculated by the second reception weight calculator 124, the second communication quality evaluation unit 128 calculates communication quality (SINR) of communications with the mobile station device 112 (device B) having smaller reception power of a reference signal (S117) as well as compares the calculated communication quality with the communication quality passed from the first communication quality evaluation unit 126 (S118).

Then, if the communication quality calculated in S117 is higher than the communication quality supplied by the first communication quality evaluation unit 126, the second communication quality evaluation unit 128 instructs the reception weight application unit 130 to apply the weight calculated by the second reception weight calculator 124. In accordance with the instruction, the reception weight application unit 130 supplies the weight to the decoder 132 (S119).

Meanwhile, if the communication quality calculated in S117 is lower than the communication quality supplied by the first communication quality evaluation unit 126, the second communication quality evaluation unit 128 instructs the reception weight application unit 130 to apply the weight stored in the reception weight storage 120. In accordance with the instruction, the reception weight application unit 130 supplies the weight to the decoder 132 (S120). Then, the decoder 132 decodes data to be transmitted from the devices A and B by using the supplied weight (S113).

(Operation/Effect)

According to the above embodiment, the base station device 110 calculates weight to be used in communications with each of the mobile station devices 112 according to a reference signal transmitted from each of the mobile station devices 112. For the mobile station device 112 (device B) having smaller reception power of a reference signal, the base station device 110 determines the arriving direction of a reference signal on the basis of the weight of the mobile station device 112 (device A) having greater reception power of a reference signal. The base station device 110 can calculate weight so that a null can be directed to the arriving direction of a reference signal, and use the calculated weight as weight to be used in communications with the device B.

Thus, even when the reception power of a reference signal from the device B is considerably lower than the reception power of a reference signal from the device A and weight of the device A has not been calculated appropriately, the base station device 110 can prevent deterioration of the communication quality, since the effect of communications with the device A on communications with the device B can be suppressed.

[Second Embodiment]

Next, a second embodiment of the present invention will be described with reference to the drawings.

(Configuration of Receiving Device)

Figure 5:
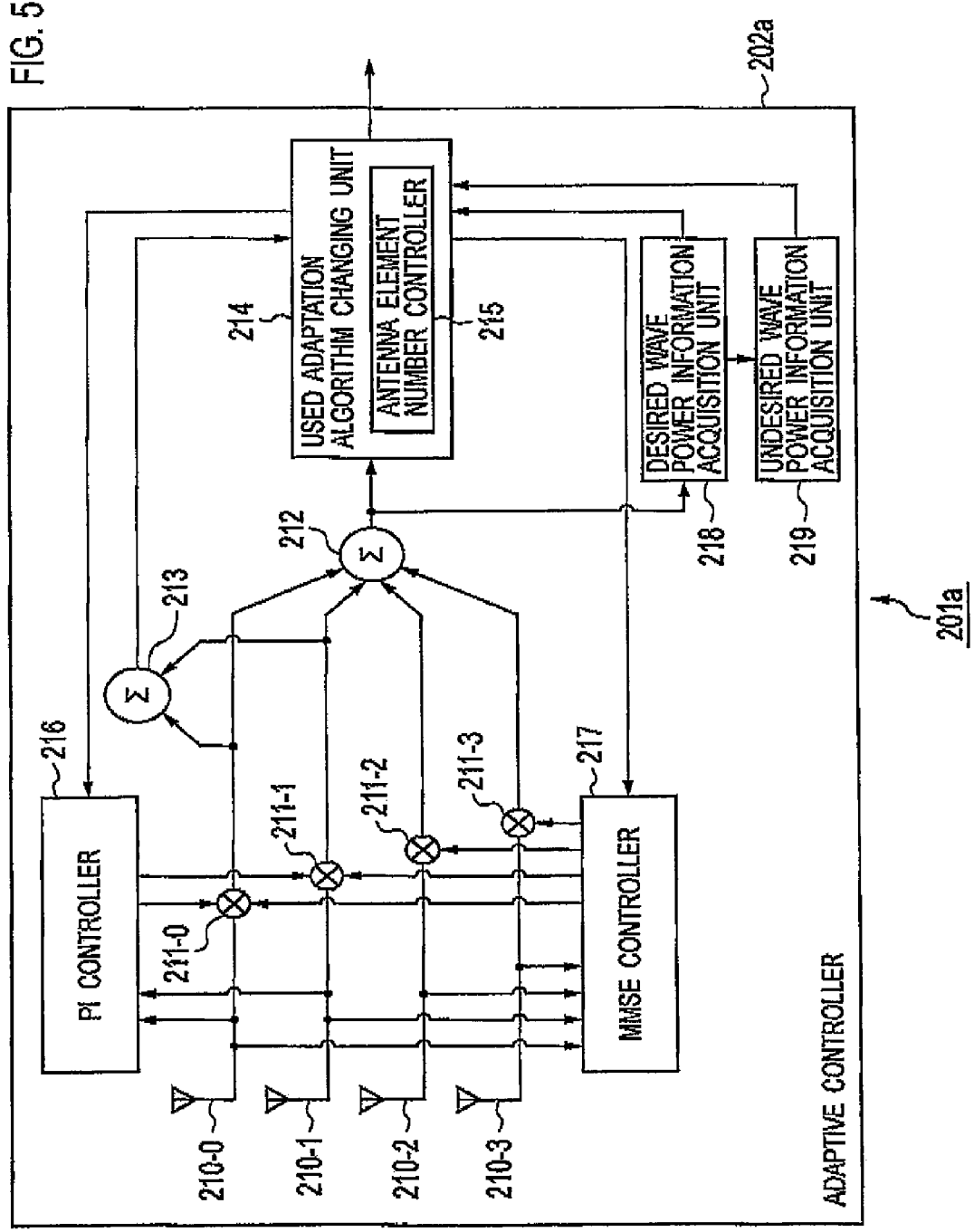
FIG. 5 is a block diagram showing a system configuration and functional blocks of a receiving device according to a second embodiment of the present invention.

FIG. 5 is a block diagram showing a system configuration and functional blocks of a receiving device 201a according to a second embodiment of this implementation. As shown in FIG. 5, the receiving device 201a includes an adaptive controller 202a. The adaptive controller 202a includes ah array antenna formed of 4 antenna elements 210 (antenna element 210-0, 210-1, 210-2, 210-3). Further, the adaptive controller 202a also includes multipliers 211 (multiplier 211-0, 211-1, 211-2, 211-3) for the respective antenna elements 210.

Further, the adaptive controller 202a includes: a synthesizer 212, a synthesizer 213, a used adaptation algorithm changing unit 214, a PI controller 216, an MMSE controller 217, a desired wave power information acquisition unit 218, and an undesired wave power information acquisition unit 219. Furthermore, the used adaptation algorithm changing unit 214 includes an antenna element number controller 215.

The receiving device 201a is a computer including a CPU and a memory. The CPU is a processing unit for executing programs stored in the memory. The CPU executes processes for controlling each unit of the receiving device 201a, as well as implements various function to be described later. The memory stores programs or data for carrying out this embodiment. The memory also works as a working memory for the CPU.

The receiving device 201a is used as a base station device of a mobile communication system. The receiving device 201a utilizes the above array antenna and performs multiplexing of communications with multiple mobile station devices according to Space-Division Multiple Access (SDMA) scheme.

The antenna elements 210-0 to 3 are assumed to receive radio waves of predetermined frequencies. Generally, the adaptive controller 202a adaptively controls radio waves (receiving waves) arriving at each antenna element 210 using MMSE. The MMSE is a kind of the desired wave optimizing type adaptation algorithm that optimizes a reception of a desired wave by utilizing a known signal.

To be specific, a receiving wave is formed of some continuous frames. A known signal is contained at a predetermined position of each frame. The MMSE controller 217 holds the known signal, and sequentially calculates a correlation value of the known signal and each receiving wave to be sequentially inputted from each of the antenna elements 210. This correlation value will be the highest value when the receiving wave and the known signal are same.

The MMSE controller 217 detects a known signal contained in a receiving wave by monitoring the calculated correlation value. Then, the MMSE controller 217 detects a frame position in the receiving wave with the detected known signal.

The MMSE controller 217 extracts a desired wave from a receiving wave received by each antenna element 210 on the basis of the detected frame position, and calculates reception weight for optimizing reception of the desired wave on the basis of the power and phase of the extracted desired wave. Then, the MMSE controller 217 outputs the calculated reception weight to each of the multipliers 211.

Each of the multipliers 211 multiplies a receiving wave by the reception weight inputted from the MMSE controller 217. The synthesizer 212 synthesizes a signal outputted from each of the multipliers 211 and outputs the synthesized signal to the used adaptation algorithm changing unit 214. As a result of the above processes, the synthesizer 212 outputs a signal in which undesired wave component has been removed from the receiving wave.

The adaptive controller 202a also has a function to adaptively control the above receiving wave by using PI. PI is a kind of the spatial component suppressing type adaptation algorithm that suppresses spatial components forming the receiving wave, depending on its power.

To be specific, the PI controller 216 acquires spatial components of a receiving wave and acquires power of each of the acquired spatial components on the basis of the respective receiving waves to be inputted from the antenna element 210-0 and the antenna element 210-1. The PI controller 216 calculates reception weight for offsetting the power of the largest spatial component among the power of the spatial components thus acquired. Then, the PI controller 216 outputs the calculated reception weight to the multiplier 211-0 and the multiplier 211-1.

The multiplier 211-0 and the multiplier 211-1 multiply the receiving wave by the reception weight inputted from the PI controller 216. The synthesizer 213 synthesizes signals outputted from the multiplier 211-0 and the multiplier 211-1 and then outputs the synthesized signal to the used adaptation algorithm changing unit 214. As a result of the above processes, the synthesizer 213 outputs a signal in which specific spatial components have been suppressed from the receiving wave.

The desired wave power information acquisition unit 218 acquires desired wave power information indicating a power level of a desired wave from a receiving wave. To be specific, the desired wave power information acquisition unit 218 utilizes the desired wave (the signal outputted from the synthesizer 212) that has been optimized by the control of the MMSE controller 217 to acquire desired wave power information.

Note that, similar to the MMSE controller 217, the desired wave power information acquisition unit 218 may hold a known signal, and sequentially calculate a correlation value of the known signal and each receiving wave to be sequentially inputted into each of the antenna elements 210. Thereby, the desired wave power information acquisition unit 218 can acquire the above desired wave power information by using a receiving wave arriving at each of the antenna elements 210 rather than the desired wave optimized by the control of the MMSE controller 217.

The undesired wave power information acquisition unit 219 acquires undesired wave power information indicating a power level of an undesired wave contained in a receiving wave. To be specific, the undesired wave power information acquisition unit 219 first acquires reception power of a receiving wave (not shown). Then, the undesired wave power information acquisition unit 219 acquires undesired wave power information on the basis of the acquired reception power and the desired wave power information acquired by the desired wave power information acquisition unit 218. More specifically, the undesired wave power information acquisition unit 219 acquires undesired wave power information by subtracting a power level indicated by desired wave power information from reception power.

The used adaptation algorithm changing unit 214 changes the adaptation algorithm to be used by the adaptive controller 202a either from MMSE to PI or from PI to MMSE, depending on undesired wave power information acquired by the undesired wave power information acquisition unit 219 and desired wave power information acquired by the desired wave power information acquisition unit 218.

More specifically, when a ratio of a power level, which is indicated by undesired wave power information to be acquired by the undesired wave power information acquisition unit 219, to a power level, which is indicated by desired wave power information to be acquired by the desired wave power information acquisition unit 218, is greater than a predetermined value, the used adaptation algorithm changing unit 214 causes the adaptive controller 202a to use PI. In contrast, when the ratio is equal to or lower than the predetermined value, the used adaptation algorithm changing unit 214 causes the adaptive controller 202a to use MMSE.

When changing an adaptation algorithm used by the adaptive controller 202a to PI, the used adaptation algorithm changing unit 214 causes the MMSE controller 217 to stop processing and causes the PI controller 216 to start processing. Afterward, the used adaptation algorithm changing unit 214 outputs a signal inputted from the synthesizer 213 to a communication processor (not shown) at the subsequent stage.

In contrast, when changing an adaptation algorithm used by the adaptive controller 202a to MMSE, the used adaptation algorithm changing unit 214 causes the PI controller 216 to stop processing and causes the MMSE controller 217 to start processing. Afterward, the used adaptation algorithm changing unit 214 outputs a signal inputted from the synthesizer 212 to a communication processor (not shown) at the subsequent stage.

Thus, the used adaptation algorithm changing unit 214 causes the adaptive controller 202a to use either MMSE or PI.

Incidentally, the spatial component suppressing type adaptation algorithm is an adaptation algorithm that suppresses spatial components, in descending order of power, among the spatial components forming a receiving wave, the number of the spatial components corresponding to the number of the antenna elements 210 (to be specific, the number of the antenna elements 210-1) which receive the receiving wave. Thus, the antenna element number controller 215 controls whether or not to use the spatial component suppressing type adaptation algorithm, and the number of the antenna elements 210 that receive the receiving wave depending on the number of spatial components, power of which is greater than desired wave components, among spatial components other than the desired wave components contained in the receiving wave.

In a specific example, assuming that the number of spatial components other than desired wave components contained in a receiving wave and power of which is greater than the desired wave components is n, the antenna element number controller 215 determines n+1 antenna elements 210 that receive receiving waves to which the PI controller 23L6 refers in order to calculate reception weight. Note that, FIG. 5 shows result of the control by the antenna element number controller 215 when the spatial components power of which is greater than the desired wave components is 1 wave (in other words, when the number of the antenna elements 210 should be 2).

The PI controller 216 outputs the calculated reception weight to the multiplier 211 corresponding to the n-M antenna elements 210. Moreover, the synthesizer 213 synthesizes a signal multiplied by the reception weight calculated by the P1 controller 216, and outputs the synthesized signal to the used adaptation algorithm changing unit 214.

(Operation/Effect)

As has been described above, according to this embodiment, the receiving device 201a can use the desired wave optimizing type adaptation algorithm in combination with the spatial component suppressing type adaptation algorithm, while making up for the disadvantages of the desired wave optimizing type adaptation algorithm and the spatial component suppressing type adaptation algorithm.

In addition, while a power level of a desired wave optimized by the desired wave optimizing type adaptation algorithm can be used as desired wave power information, desired wave power information can also be acquired irrespective of whether or not the desired wave optimizing type adaptation algorithm performs adaptive control.

Furthermore, even when the spatial component suppressing type adaptation algorithm that suppresses spatial components the number of which corresponds to the number of the antenna elements is used, suppression of a desired wave can be avoided.

[First Modification of Second Embodiment]

Next, a first modification of the second embodiment of the present invention will be described with reference to the drawings.

Figure 6:
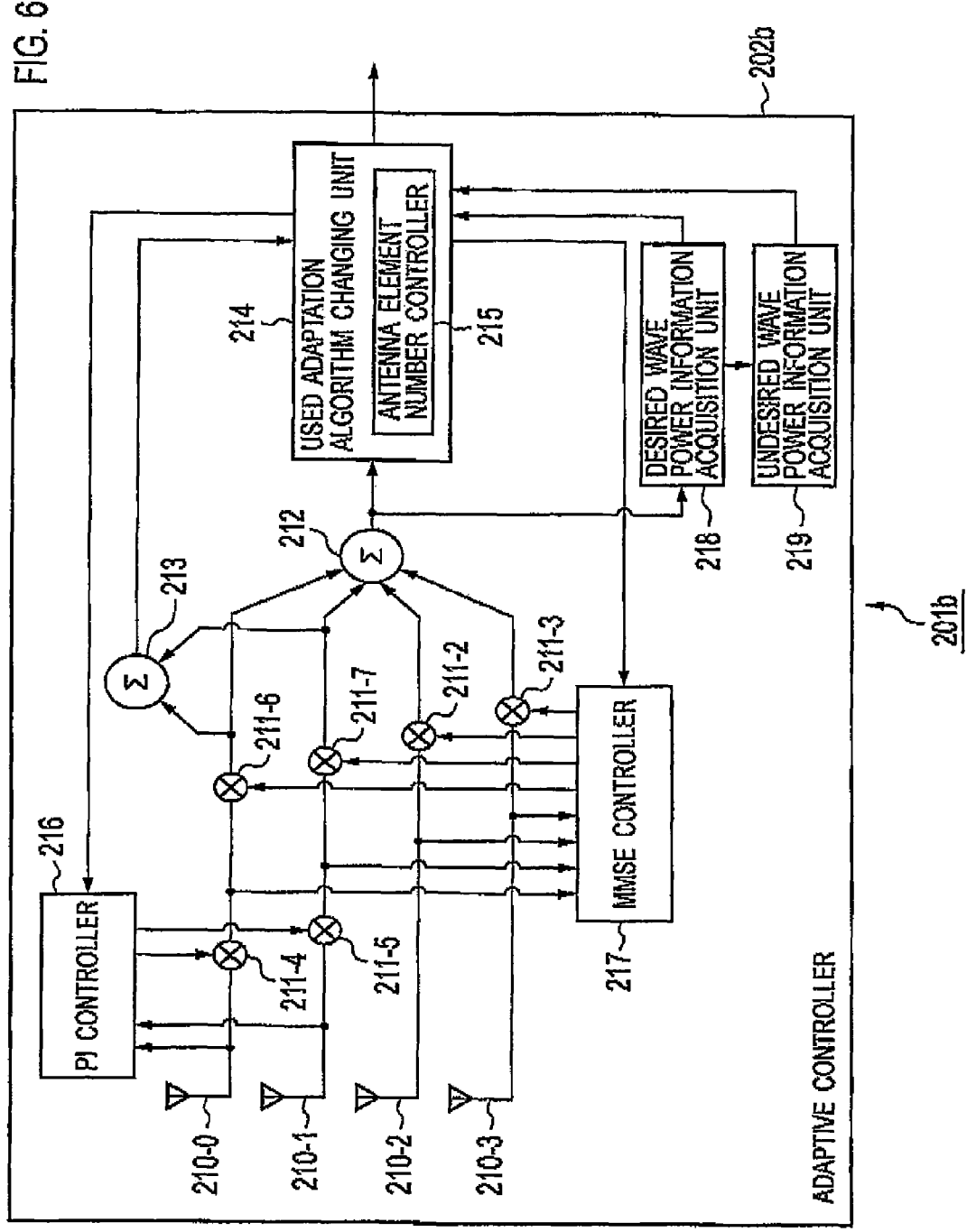
FIG. 6 is a block diagram showing a system configuration and functional blocks of a receiving device according to a first modification of the second embodiment of the present invention.

FIG. 6 is a block diagram showing a system configuration and functional blocks of a receiving device 201b according to the first modification of the second embodiment of the present invention. As shown in FIG. 6, the receiving device 201b includes an adaptive controller 202b instead of the adaptive controller 202a. The adaptive controller 202b separates the multiplier 211-0 and the multiplier 211-1 in the above-described adaptive controller 202a into a multiplier 211-4 and a multiplier 211-6, and into a multiplier 211-5 and a multiplier 211-7, respectively. In the adaptive controller 202b, the MMSE controller 217 refers to a receiving wave after the PI controller 216 multiplies reception weight.

This enables the adaptive controller 202b to perform adaptive control by both PI and MMSE at all times. Thus, as in the second embodiment described above, the used adaptation algorithm changing unit 214 can change an adaptation algorithm without stopping the process of one adaptation algorithm and performing the process of starting the other adaptation algorithm.

[Second Modification of Second Embodiment]

A second modification of the second embodiment of the present invention will be described with reference to the drawings.

(Configuration of Receiving Device)

Figure 7:
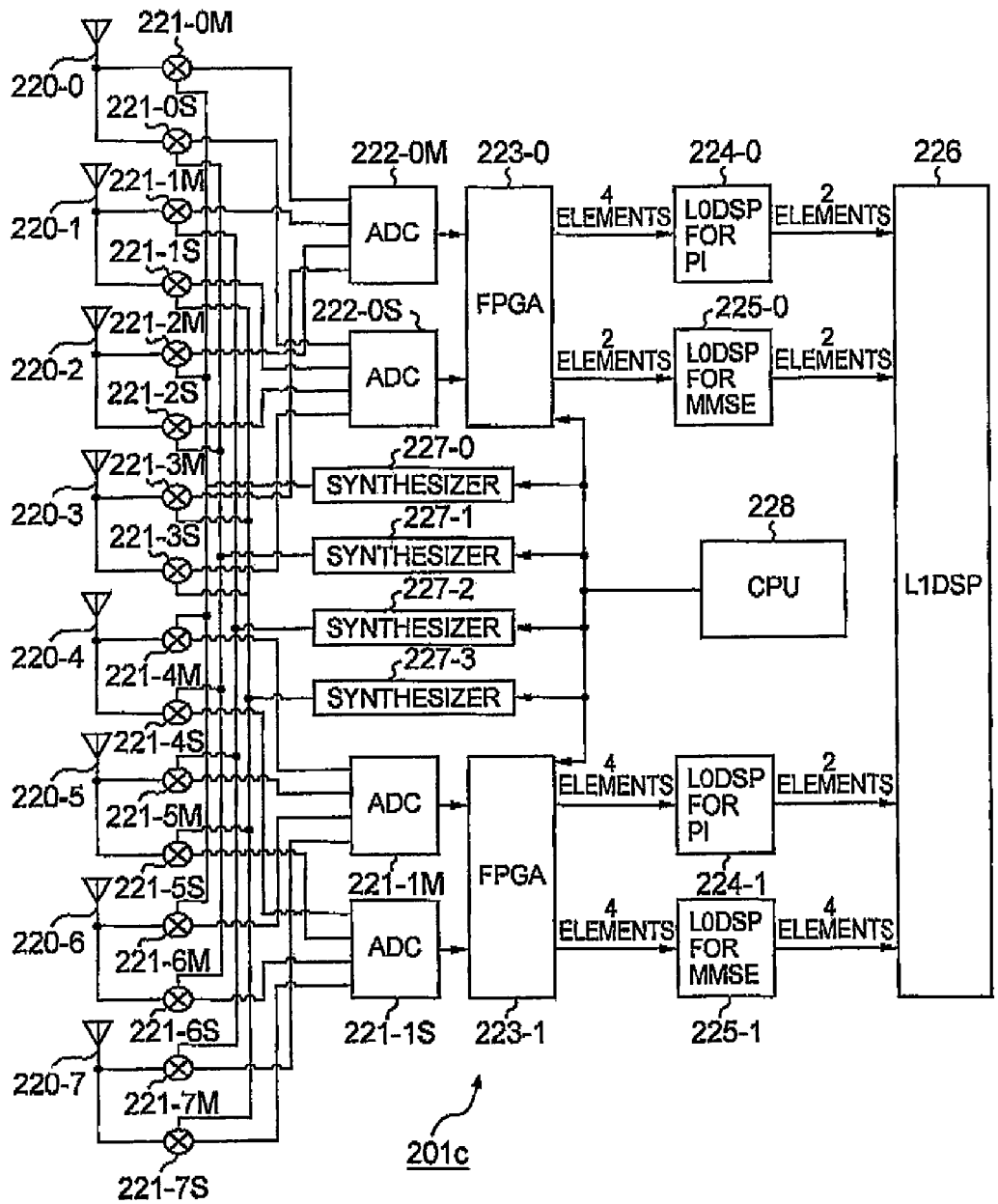
FIG. 7 is a block diagram showing a system configuration of a receiving device according to a second modification of the second embodiment of the present invention, illustrating, in particular, the case in which the receiving device operates in 4RF mode.

FIG. 7 is a drawing showing a system configuration of a receiving device 201c according to the second modification of the second embodiment of the present invention. As shown in FIG. 7, the receiving device 201c includes an array antenna formed of eight antenna elements 220 (antenna elements 220-0, 220-1, 220-2, 220-3, 220-4, 220-5, 220-6, 220-7).

Moreover, the receiving device 201c includes a master frequency component retrieving unit 221 and slave frequency component retrieving unit 221, one each for every antenna element 220. To be specific, the receiving device 201c includes frequency component retrieving units 221-xM and 221-xS for the antenna elements 220-x (x=0 to 7), respectively.

Further, the receiving device 201c includes: ADCs (Analog Digital Converters) 222-0M, 222-0S, 222-1M and 222-1S; FPGAs (Field Programmable Gate Arrays) 223-0 and 223-1; L0DSPs for PI (Layer 0 Digital Signal Processors) 224-0 and 224-1; L0DSPs for MMSE 225-0 and 225-1; an L1DSP (Layer 1 Digital Signal Processor) 226; synthesizers 227-0, 227-1, 227-2 and 227-3; and a CPU (Central Processing Unit) 228.

The receiving device 201c includes the CPU and a memory, and functions as a computer. The CPU is a processing unit for executing programs stored in the memory. The CPU performs process for controlling various parts of the receiving device 201c, as well as implements each function to be described below. The memory stores programs and data for carrying out this embodiment. The memory also serves as a working memory for the CPU.

The receiving device 201c is used as a base station device for a mobile communication system. The receiving device 201c utilizes the above array antenna and performs multiplexing of communications with each of the multiple mobile station devices, by Space-Division Multiple Access (SDMA) scheme.

Figure 8:
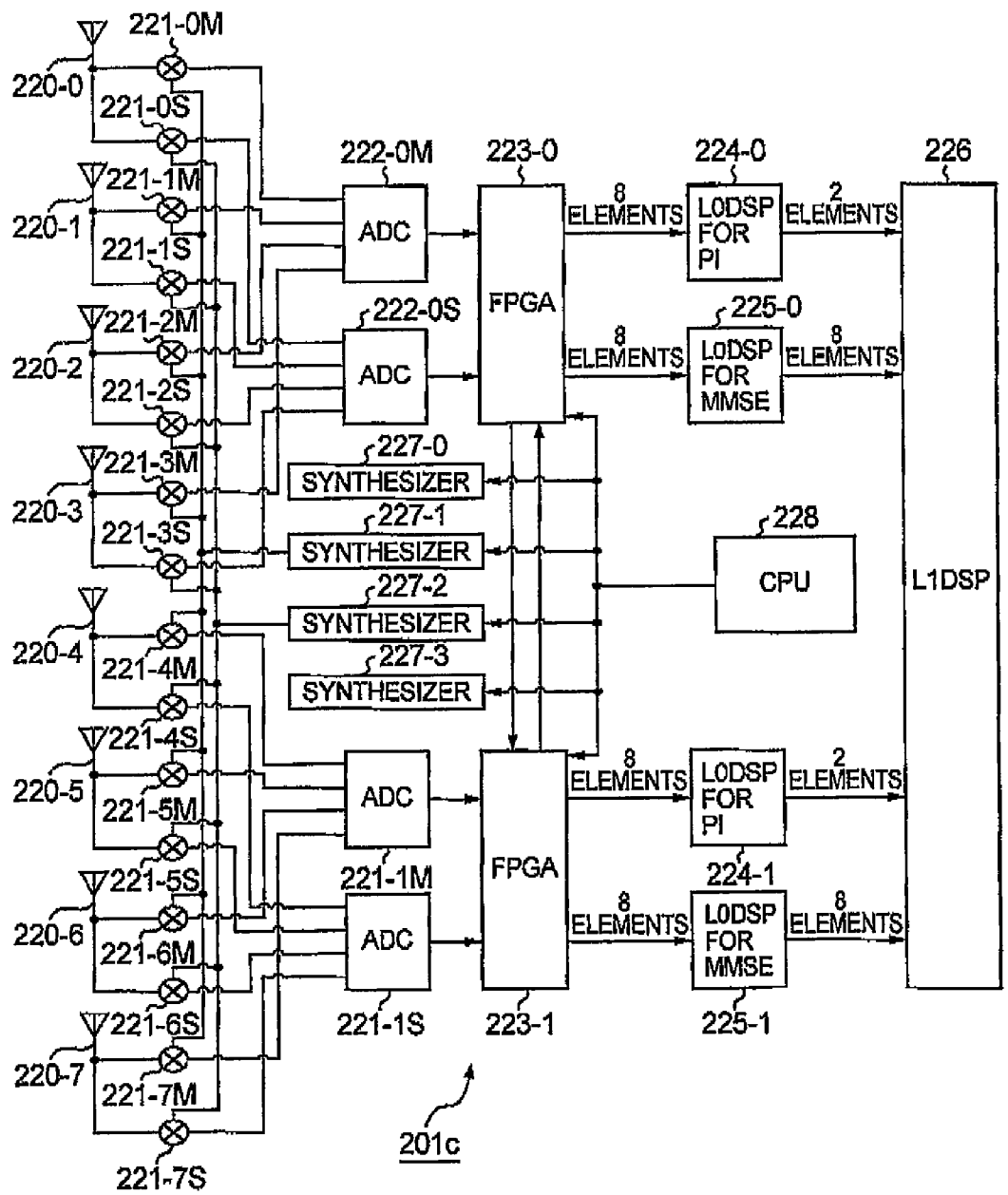
FIG. 8 is a block diagram showing the system configuration of the receiving device according to the second modification of the second embodiment of the present invention, illustrating, in particular, the case in which the receiving device operates in 2RF mode.

Further, the receiving device 201c operates under any one of 4RF (Radio Frequency) mode, 2RF mode, and 1RF mode. The 4RF mode, the 2RF mode and the 1RF mode are modes of receiving signals at 4 kinds of frequencies, 2 kinds of frequencies and 1 kind of frequency, respectively. FIG. 7 shows the condition in which the receiving device 201c is operating in the 4RF mode. In addition. FIG. 8 shows the condition in which the receiving device 201c operates in the 2RF mode.

The CPU 228 determines in which of the above modes the receiving device 201c is caused to operate, and controls each unit according to the determination.

To be specific, if determining that the receiving device 201c is caused to operate in the 4RF mode, the CPU 228 causes all the synthesizers 227 to generate signals of different frequencies from one another. Furthermore, the CPU 228 causes the signal generated by each of the synthesizers 227 to be inputted into 4 frequency component retrieving units 221 which are different from one another.

To be specific, an oscillation signal of the synthesizer 227-0 is inputted into frequency component retrieving units 221-0M, 221-2M, 221-4M, and 221-6M. An oscillation signal of the synthesizer 227-1 is inputted into frequency component retrieving units 221-0S, 221-2S, 221-4S, and 221-6S. An oscillation signal of the synthesizer 227-2 is inputted into frequency component retrieving units 221-1M, 221-3M, 221-5M and 221-7M. An oscillation signal of the synthesizer 227-3 is inputted into frequency component retrieving units 221-1S, 221-3S, 221-5S, and 221-7S.

In addition, if determining that the receiving device 201c is caused to operate in the 2RF mode, the CPU 228 causes only the synthesizers 227-1 and 227-2 to generate signals of different frequencies from each other. Furthermore, the CPU 228 causes the signal generated by each of the synthesizers 227-1 and 227-2 to be inputted into eight frequency component retrieving units 221.

To be specific, an oscillation signal of the synthesizer 227-1 is inputted into all the master frequency component retrieving units 221 (the frequency component retrieving units 221-0M, 221-1M, 221-2M, 221-3M, and the frequency component retrieving units 221-4M, 221-5M, 221-6M and 221-7M).

The oscillation signal of the synthesizer 227-2 is inputted into all the slave frequency component retrieving units 221 (the frequency component retrieving units 221-0S, 221-1S, 221-2S, 221-3S and the frequency component retrieving units 221-4S, 221-5S, 221-6S and 221-7S).

Furthermore, if determining that the receiving device 201c is caused to operate in the 1RF mode, the CPU 228 causes only the synthesizer 227-1 to generate a signal and input the signal to all the frequency component retrieving units 221.

The CPU 228 controls each of the FPGAs 223 so that output process of digital signals as will be described later may be performed.

In the following, the 4RF mode and the 2RF mode will be described respectively in detail.

First, the 4RF mode as shown in FIG. 7 will be described.

Each of the antenna elements 220 receives a radio wave to acquire an analog signal, and outputs it to the corresponding frequency component retrieving unit 221.

Depending on the frequency of the signal inputted from the synthesizer 227-1, each of the frequency component retrieving units 221 retrieves the component of the frequency from the analog signal inputted through the corresponding antenna element 220 and inputs it into the corresponding ADC 222.

As a result, each of the ADCs 222 receives inputs of 4 lines of analog signals from the frequency component retrieving units 221. To be specific, the analog signals acquired by the master frequency component retrieving units 221-nM (n=0 to 3) are inputted into the ADC 222-0M. The analog signals acquired by the slave frequency component retrieving units 221-nS (n=0 to 3) are inputted into the ADC 222-0S. The analog signals acquired by the master frequency component retrieving units 221-nM (n=4 to 7) are inputted into the ADC 222-1M. The analog signals acquired by the slave frequency component retrieving units 221-nS (n=4 to 7) are inputted into the ADC 222-1S.

Each of the ADCs 222 converts the respective lines of inputted analog signals into digital signals, and outputs them to the corresponding FPGA 223.

Each of the FFGAs 223 controls where to output the digital signals inputted from each of the ADCs 222. Here, the FPGA 223 inputs the digital signals inputted from the master ADC 222 into the corresponding L0DSP for PI 224. Meanwhile, the FPGA 223 inputs the digital signals inputted from the slave ADC 222 into the corresponding L0DSP for MMSE 225. Thereby, among the radio waves received by the respective antenna elements 220, the respective 4 lines of the digital signals corresponding to frequency components different from one another are inputted into L0DSP for PI 224-0, L0DSP for PI 224-1, L0DSP for MMSE 225-0, and L0DSP for MMSE 225-1.

Each of the L0DSPs for PI 224 only acquires the predetermined 2 lines of digital signals of the inputted 4 lines thereof. In this way, in this modification, the number of antenna elements that receive receiving waves is controlled through internal processing of each of the L0DSPs for PI 224. Then, PI performs adaptive control process by using the acquired 2 lines of digital signals. In other words, spatial components forming receiving waves that arrive at the respective antenna elements 220 are suppressed depending on their power.

To be specific, on the basis of the inputted 2 lines of digital signals, each of the L0DSP for PI 224 acquires spatial components of the receiving wave and acquires power of the respective spatial components thus acquired. Each of the L0DSPs for PI 224 calculates reception weight to offset the largest power among the power of the respective spatial components thus acquired. Then, each of the L0DSPs for PI 224 multiplies the digital signals by the calculated reception weight. The digital signals to be obtained as a result of the multiplication will be digital signals with the spatial component of the largest power suppressed.

Each of the L0DSPs for PI 224 outputs the digital signals thus obtained to the L1DSP 226.

Each of the L0DSPs for MMSE 225 performs adaptive control process with MMSE by using the inputted 4 lines of digital signals. In other words, each of the L0DSPs for MMSE 225 utilizes a known signal and optimizes reception of a desired wave contained in receiving waves that arrive at the respective antenna elements 220.

To be specific, a digital signal is composed of several continuous frames. A known signal is contained at a predetermined position in each frame. Each of the L0DSPs for MMSE 225 holds the known signal and sequentially calculates a correlation value of each digital signal to be sequentially inputted and the known signal. The correlation value becomes the greatest value when the digital signal and the known signal are same.

Each of the L0DSPs for MMSE 225 detects a known signal contained in a digital signal by monitoring correlation values. Then, each of the L0DSPs for MMSE 225 detects a frame position in the digital signal with the detected known signal. Each of the L0DSPs for MMSE 225 extracts a desired wave received by each of the antenna elements 220 on the basis of the frame position thus detected, and calculates reception weight for optimizing reception of the desired wave on the basis of the power and phase of the extracted desired wave. Then, the digital signal is multiplied by the reception weight.

Generally, the L1DSP 226 acquires reception data by using a digital signal to be inputted from each of the L0DSPs for MMSE 225.

On the one hand, while acquiring reception data by using the digital signals to be inputted from the L0DSPs for MMSE 225, the L1DSP 226 constantly acquires desired wave power information indicating a power level of a desired wave and undesired wave power information indicating a power level of an undesired wave (components other than the desired wave) contained in a receiving wave. Then, depending on the desired wave power information and the undesired wave power information, the L1DSP 226 changes a digital signal used for acquiring reception data into a digital signal to be inputted from each of the L0DSPs for PI 224. Thus, the L1DSP 226 changes an adaptation algorithm to be used in the reception of receiving waves.

More specifically, the L1DSP226 acquires the above desired wave power information and the above undesired wave power information on the basis of the digital signals inputted from the L0DSP for MMSE 225-0. Then, when a ratio of a power level indicated by the undesired wave power information to a power level indicated by the desired wave power information is greater than a predetermined value, the L1DSP 226 acquires reception data by utilizing the digital signals inputted from the L0DSP for PI 224-0.

Similarly, the L1DSP 226 acquires the above desired wave power information and the above undesired wave power information on the basis of the digital signals inputted from the L0DSP for MMSE 225-1. Then, when the ratio of a power level indicated by the undesired wave power information to a power level indicated by the desired wave power information is greater than a predetermined value, the L1DSP 226 acquires reception data by utilizing the digital signals inputted from the L0DSP for PI 224-1.

(Operation/Effect)

As described above, similar to the receiving devices 201a and 201b, the receiving device 201c enables a combined use of the desired wave optimizing type adaptation algorithm and the spatial component suppressing type adaptation algorithm while making up for the respective disadvantages.

In addition, while a power level of a desired wave that is optimized by the desired wave optimizing type adaptation algorithm can be used as desired wave power information, desired wave power information can be acquired irrespective of whether or not the adaptive control is performed with the desired wave optimizing type adaptation algorithm.

Furthermore, even when the spatial component suppressing type adaptation algorithm that suppresses spatial components corresponding to the number of antenna elements is used, suppression of a desired wave can be avoided.

Note that, it is preferable that the CPU 228 changes the oscillating frequency of the synthesizer 227 in conjunction with the above adaptation algorithm. Specifically, when the frequency of a desired wave is f, the CPU 228 controls the oscillating frequency of the synthesizer 227 so that the L0DSP for MMSE 225 can generally acquire a digital signal of a receiving wave, which corresponds to the component of the frequency f. In contrast, when the L1DSP 226 has made the above change, the CPU 228 controls the oscillating frequency of the synthesizer 227 so that the L0DSP for PI 224 can acquire a digital signal of a receiving wave, which corresponds to the component of the frequency f. This enables the component of the frequency f contained in the receiving wave to be continuously received even after a change of the adaptation algorithm by the L1DSP 226.

In addition, the L1DSP 226 may acquire the above undesired wave power information on the basis of the digital signal to be inputted from the L0DSP for PI 224. In this case, it can acquire the undesired wave power information on the frequency of a desired wave as well as its neighboring frequencies by setting the synthesizer 227-1 to frequency f of the desired wave and the synthesizer 227-0 to neighboring frequencies of the frequency f.

(Adaptation Algorithm Control Process)

In the following, adaptation algorithm control process to be performed by the receiving device 201c in the 4RF mode will be described again in more detail with reference to the process flow.

Figure 9:
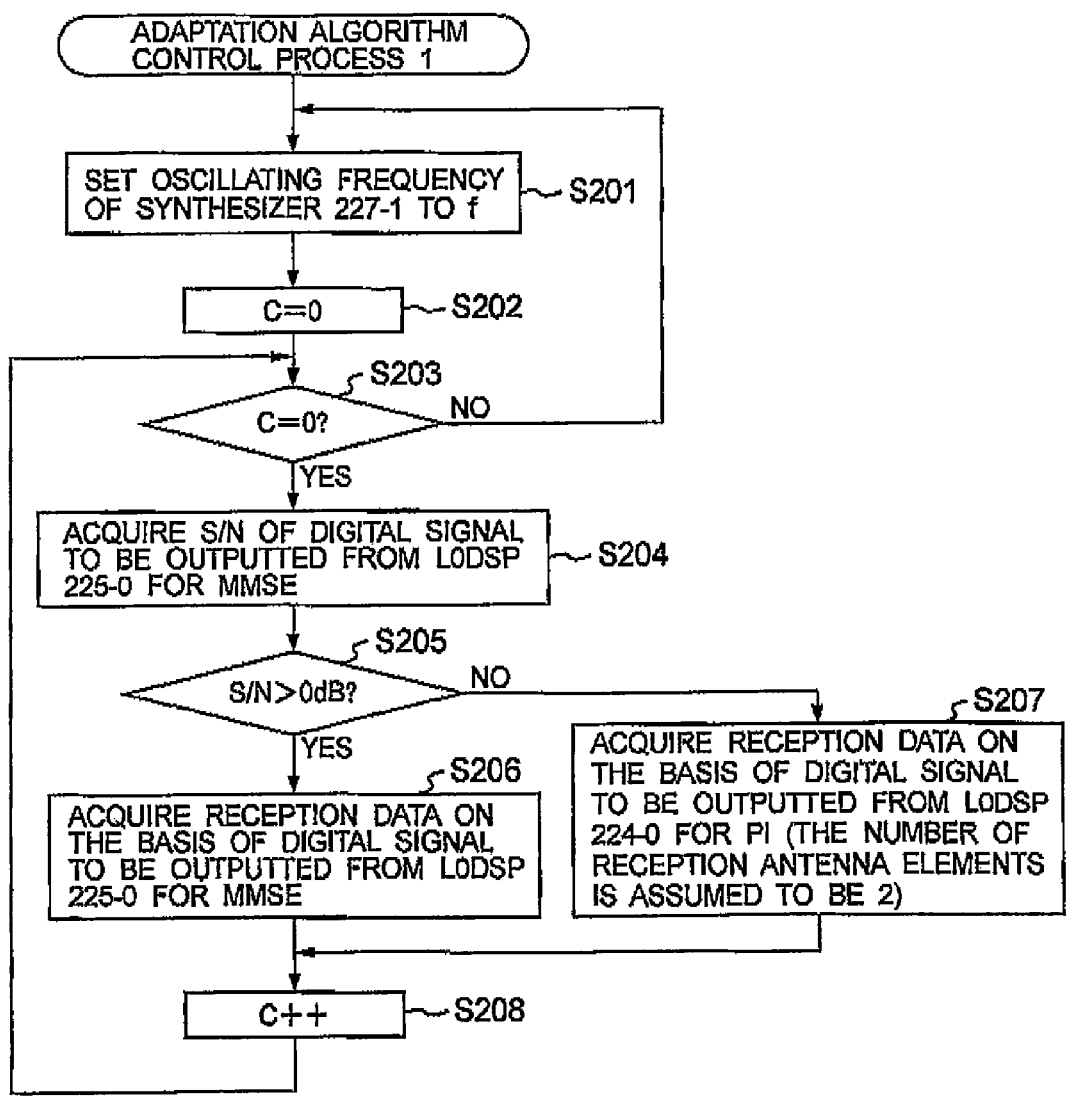
FIG. 9 is a flowchart showing a process flow of the receiving device according to the second modification of the second embodiment of the present invention.

FIG. 9 is a flowchart showing a process flow of the receiving device 201c. As shown in FIG. 9, the receiving device 201 first sets the oscillating frequency of the synthesizer 227-1 to f (S201). Then, the receiving device 201c secures a storage area for a variable C and substitutes 0 (3202).

If a value of the variable C is 0, the receiving device 201c performs the following processes (S203).

The receiving device 201c acquires an S (Signal: desired wave)/N (Noise: undesired wave) ratio of a digital signal to be outputted from the L0DSP for MMSE 225-0 (S204). Then, it determines whether or not the S/N ratio is equal to or greater than 0 dB (S205).

Note that, in order to switch an adaptation algorithm to be used in reception of receiving waves to PI, the S/N ratio of a digital signal to be inputted into the L0DSP for PI 224-0 needs to be 0 dB or lower. However, desired wave components of a digital signal to be outputted from the L0DSP for MMSE 225-0 has been amplified with gain (MMSE gain) corresponding to the number of lines of input digital signals, and the s/N ratio of the digital signal to be outputted from the L0DSP for MMSE 225-0 is considerably higher than the S/N ratio of a digital signal to be inputted into the L0DSP for MMSE 225-0 (which is equal to the S/N ratio of a digital signal to be inputted into the L0DSP for PI 224-0).

Consequently, even if the S/N ratio of the digital signal to be outputted from the L0DSP for MMSE 225-0 is simply compared with 0 dB, no significant result can be obtained. Thus, in the process of S204, the S/N ratio is acquired after subtracting the above MMSE gain from the power level (S) of the desired wave component contained in the digital signal to be outputted from the L0DSP for MMSE 225-0.

In S205, if it is determined that the S/N ratio is greater than 0 dB (i.e., if the power level of the desired wave is greater than that of the undesired wave), the receiving device 201c acquires reception data on the basis of the digital signal to be outputted from the L0DSP for MMSE 225-0 (S206). In contrast, if the ratio is 0 dB or lower (i.e., if the power level of the desired wave is equal to or lower than that of the undesired wave), the receiving device 201c acquires reception data on the basis of the digital signal to be outputted from the L0DSP for PI 224-0 (S207). After the above processes end, the receiving device 201c increments C by 1 (S208), and returns the process to S203. As a result, the process of the receiving device 201c returns to S201.

Figure 10:
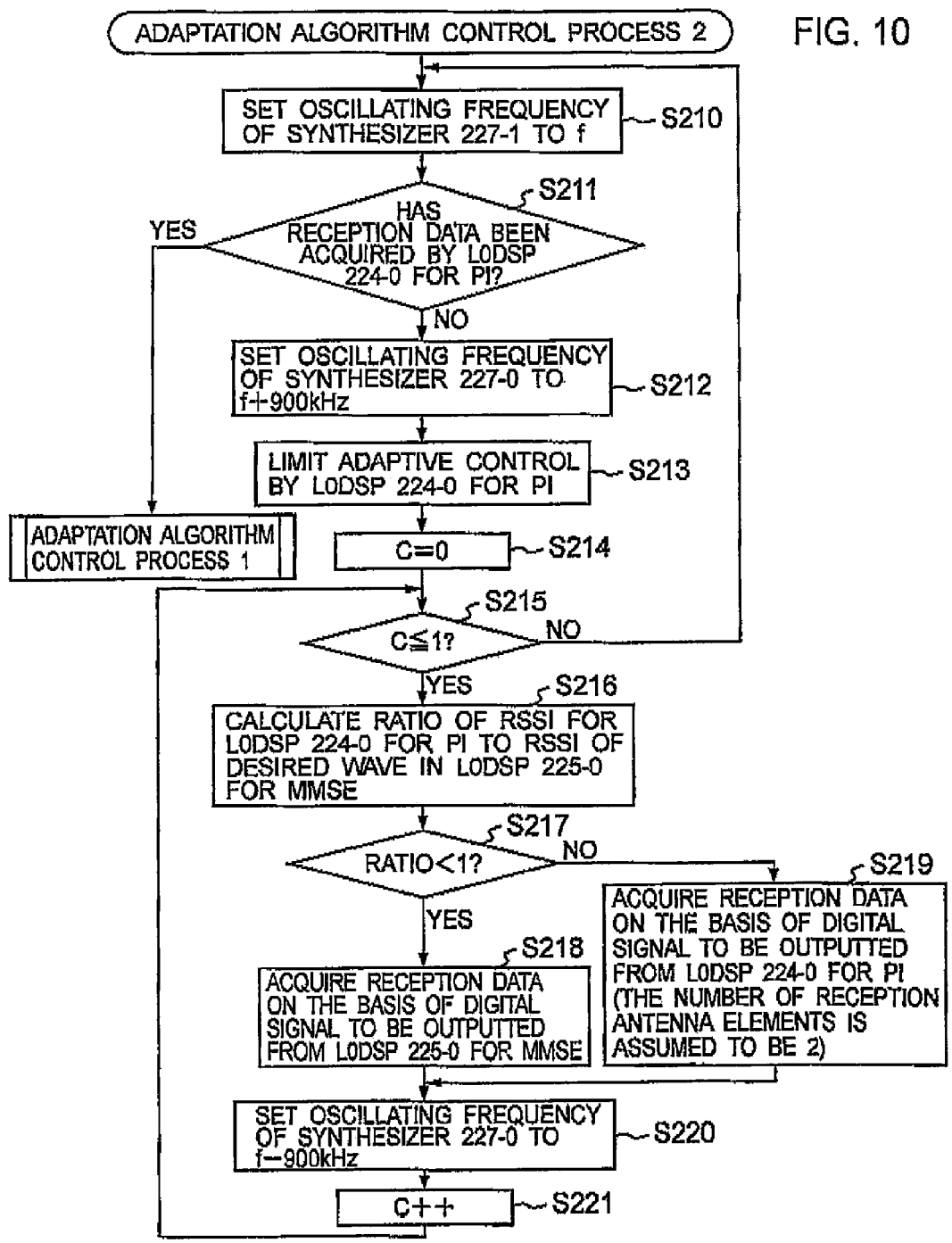
FIG. 10 is a flowchart showing the process flow of the receiving device according to the second modification of the second embodiment of the present invention.

FIG. 10 is also a view showing a process flow of the receiving device 201c. The receiving device 201c may perform an adaptation algorithm control process in accordance with the process flow shown in FIG. 10. In the adaptation algorithm control process, the receiving device 201c first sets the oscillating frequency of the synthesizer 227-1 to f (S210). Then, the receiving device 201c determines whether or not the reception data has been acquired by the L0DSP for PI 224-0 (S211). In other words, the receiving device 201c determines whether or not the L0DSP for PI 224-0 is offered for communications.

If the reception data has been acquired by the L0DSP for PI 224-0, the receiving device 201c performs the adaptation algorithm control process shown in FIG. 9. In contrast, if the reception data has not been acquired by the L0DSP for PI 234-0, the receiving device 201c utilizes the L0DSP for PI 224-0 and acquires undesired wave power information on neighboring frequencies.

In other words, the receiving device 201c sets the oscillating frequency of the synthesizer 227-0 to f+900 kHz (neighboring frequencies of f) (S212). Then, it limits the adaptive control by the L0DSP for PI 224-0, so that the adaptive control to be performed in the L0DSP for PI 224-0 is not performed. Then, the receiving device 201c secures a memory area for the variable C and substitutes 0 (S214).

When a value of the variable C is 1 or less, the receiving device 201c performs the following processes (S215).

The receiving device 201c acquires RSSI (Received Signal Strength Indicator) of receiving waves (referred to as undesired wave BSSI) to be received in the neighboring frequencies of f on the basis of a digital signal to be outputted from the L0DSP for PI 224-0. Further, the receiving device 201c acquires RSSI of a desired wave (referred to as desired wave RSSI) on the basis of a digital signal to be outputted from the L0DSP for MMSE 225-0. Note that, the desired wave RSSI is also preferably acquired by subtracting the MMSE gain, similar to the above. The receiving device 201c acquires a ratio of the undesired wave RSSI to the desired wave RSSI. (S216) and compares the ratio with a digit 1 (S217).

As a result of the comparison, if the ratio is smaller than 1 (i.e., if the power level of the desired wave is greater than that of the undesired wave), the receiving device 1c acquires reception data on the basis of a digital signal to be outputted from the L0DSP for MMSE 225-0 (S218). In contrast, if it is equal to or greater than 1 (i.e., if the power level of the desired wave is equal to or smaller than that of the undesired wave), the receiving device 201c acquires the reception data on the basis of a digital signal to be outputted from the L0DSP for PI 224-0 (S219).

When the above processes end, the receiving device 201c sets the oscillating frequency of the synthesizer 227-0 to f −900 kHz (neighboring frequencies of f) (S220). Then, it increments C by 1 (S221), and returns the process to S215. Thereby, the receiving device 201c performs the above processes for the neighboring frequencies f±900 kHz.

Next, description will be given taking the case in 2RF mode shown in FIG. 8 as an example. Here, only differences from the 4RF mode will be described.

In the 2RF mode, the ADC 222-0M and ADC 222-1M receive inputs of analog signals corresponding to same frequency (which is assumed to be f1) components of radio waves received by each of the antenna elements 220. Similarly, the ADC 222-0S and ADC 222-1S also receive inputs of analog signals corresponding to same frequency (which is assumed to be f2) components of the radio waves received by each of the antenna elements 220.

The FPGA 223-0 outputs a digital signal inputted from the ADC 222-0S to the FPGA 223-1. Thereby, all digital signals corresponding to the frequency f2 are inputted into the FPGA 22301. The FFGA 223-1 also outputs a digital signal inputted from the ADC 22201M to FPGA 223-0. Thereby, all digital signals corresponding to the frequency f1 are inputted into the FPGA 223-0.

The FPGA 223-0 further inputs 8 lines of digital signals inputted from the ADC 222-0M and the FPGA 223-1 into the L0DSP for PI 224-0 and the L0DSP for MMSE 225-0. Furthermore, the FPGA 223-1 also inputs 8 lines of digital signals inputted from the ADC 222-1S and the FPGA 223-0 into the L0DSP for PI 224-1 and the L0DSP for MMSE 225-1.

Thereby, while the receiving device 201c in the 2RF mode can achieve similar effect as in the case of the 4RF mode, digital signals corresponding to same frequency components are inputted into the L0DSP for PI 224 and the L0DSP for MMSE 225. Thus, even after the L1DSP 226 changes the adaptation algorithm, reception of components of the frequency f contained in received waves can be continued without changing the oscillating frequency of the synthesizer 227 as in the 4RF mode. In addition, the L0DSP for MMSE 225 can obtain better reception quality since adaptive control process by MMSE can be performed using the B lines of digital signals.

[Third Embodiment]

A third embodiment of the present invention will be described in detail hereinafter on the basis of the drawings.

(Overall Configuration of a Radio Communication System)

Figure 11:
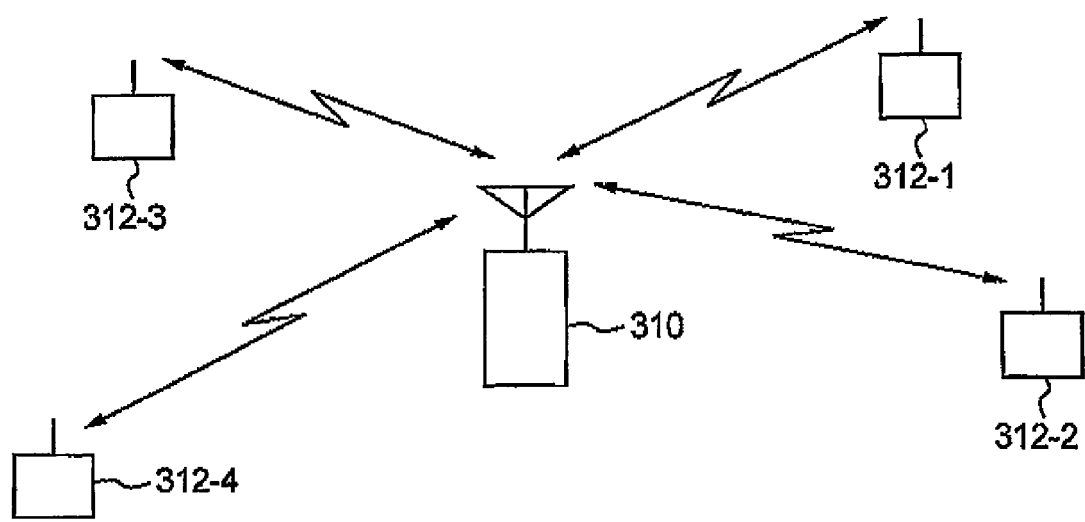
FIG. 11 is a configuration diagram of a mobile communication system according to a third embodiment of the present invention.

FIG. 11 is an overall configuration diagram of a radio communication system according to a third embodiment of the present invention. As shown in FIG. 11, the mobile communication system includes a radio communication device 310 and mobile station devices 312 (assume that there are 4 mobile station devices here).

Each of the mobile station devices 312 is a portable phone or a handheld terminal, for example, and performs radio communications with the radio communication device 310. Here, each of the mobile station devices 312 performs multiplex communication according to the Time Division Multiple Access scheme. Radio channels (communication channels) to be used in each communication are formed of transmission channels and reception channels to each of which a slot having a same slot number but a different time interval is assigned. In addition, same carrier frequency is assigned to each of a transmission channel (transmission slot) and a reception channel (reception slot) corresponding to the transmission channel.

As will be described later, the radio communication device 310 includes an array antenna and communicates with each of the mobile station devices 312 using the array antenna. Further, the radio communication device 310 assigns multiple slots to a part of the respective mobile station devices 312, and performs slot diversity communication that transmits and receives same data with each of the mobile station devices 312, by using the multiple slots.

(Configuration of Radio Communication Device)

Figure 12:
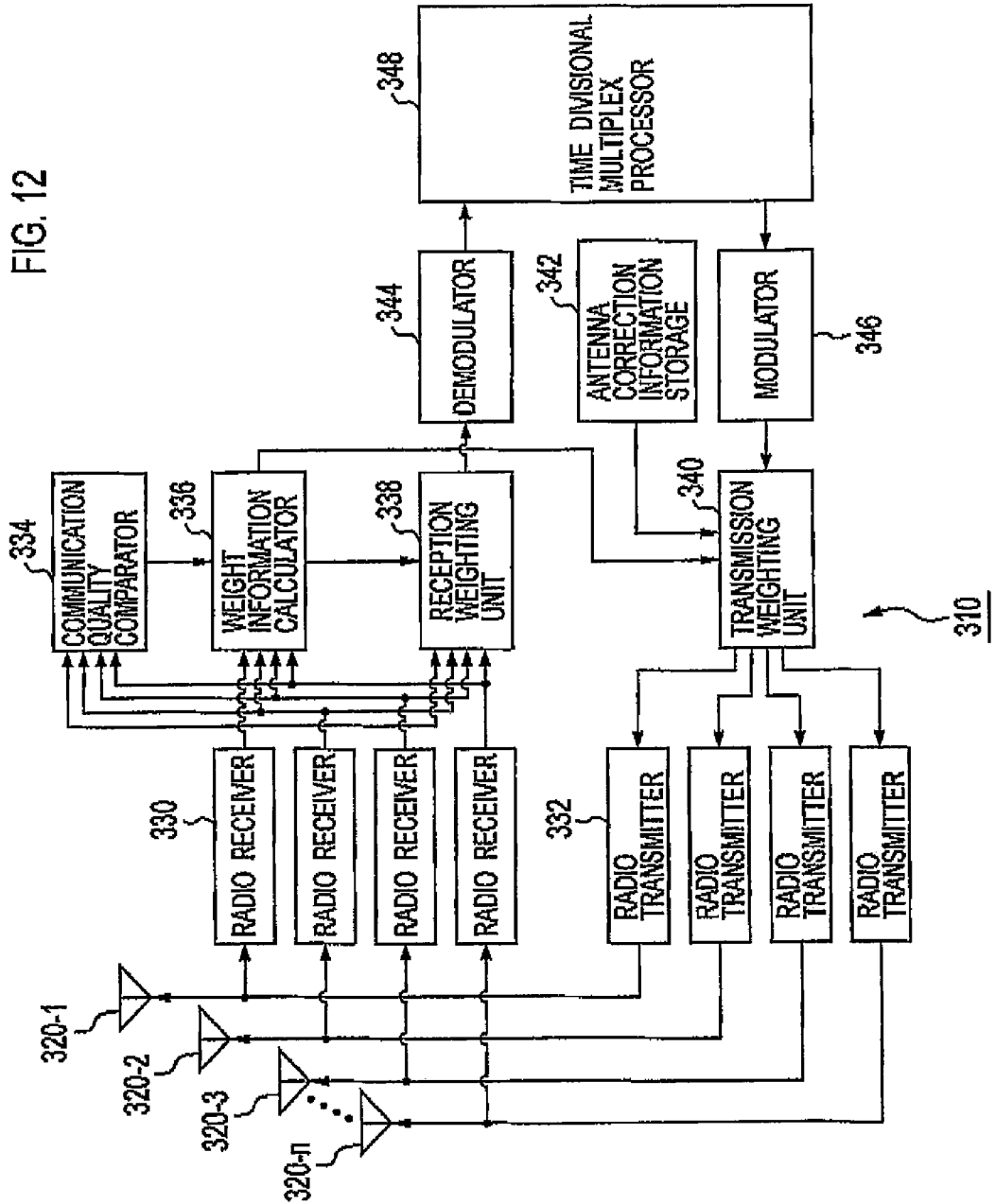
FIG. 12 is a block diagram of a radio communication device according to the third embodiment of the present invention.

FIG. 12 is a functional block diagram of the radio communication device 310. The radio communication device 310 includes an array antenna 320, a radio receiver 330, a radio transmitter 332, a communication quality comparator 334, a weight information calculator 336, a reception weighting unit 338, a transmission weighting unit 340, an antenna correction information storage 342, a demodulator 344, a modulator 346, and a time divisional multiplex processor 348.

The array antenna 320 is an array of multiple antenna elements 320-1 to 320-n. The array antenna 320 transmits a signal to be inputted from the radio transmitter 332 by the antenna elements 320-1 to 320-n. The array antenna 320 receives a signal to be transmitted from each of the mobile station devices 312 by the antenna elements 320-1 to 320-n, and outputs the signal to the radio receiver 330. The transmission and reception can be switched by time division.

The radio receiver 330 includes a low noise amplifier, a down converter, an A/D converter, and the like. The radio receiver 330 down-converts each radio signal to be received by the antenna elements 320-1 to 320-n after amplification, and outputs the down-converted radio signals to the communication quality comparator 334, the weight information calculator 336, and the reception weighting unit 338, respectively.

The radio transmitter 332 includes a D/A converter, up converter, amplifier, and the like. The radio transmitter 332 up-converts each transmitting signal to be inputted from the transmission weighting unit 340 into a radio signal, amplifies it to the transmission output level, and supplies the amplified transmitting signals to the antenna elements 320-1 to 320-n, respectively.

Among multiple reception slots to be used in slot diversity reception, the communication quality comparator 334 compares communication quality of received signals in each reception slot contained in the multiple reception slots.

To be specific, the communication quality comparator 334 detects communication quality in each reception slot from received signals of the antenna elements 320-1 to 320-n to be inputted from the radio receiver 330. The communication quality comparator 334 compares the detected communication quality in the above multiple reception slots and outputs the comparison result to the weight information calculator 336. For example, CINR (Carrier to Interference and Noise Ratio), CIR (Carrier to Interference Ratio), CNR (Carrier to Noise Ratio), noise level after automatic gain control (AGC) or the like can be used as the communication quality. In addition, communication rate may also be used as the communication quality.

For a part of reception slots of the multiple reception slots according to the slot diversity reception, the weight information calculator 336 uses an algorithm different from an algorithm to be used for other reception slots to calculate weight information (weight) for each of the antenna elements 320-1 to 320-n, on the basis of the comparison result of the communication quality to be inputted from the communication quality comparator 334. The weight information calculator 336 outputs the calculated weight information piece to the reception weighting unit 338 and the transmission weighting unit 340, respectively.

This enables not less than two algorithms having different effects to be used for weighting the received signals containing identical data in the slot diversity reception. This also enables radio signals having not less than two different directional patterns to be transmitted in the slot diversity transmission. Note that, for calculation of weight information, a gain prioritized algorithm such as MRC (Maximum Ratio Combining), or interference suppression prioritized algorithms such as LMS (Least Mean Squares), which is one of the MMSE (Minimum Mean Square Error) that minimizes a mean square error of a signal in a predetermined section in a received signal and a reference signal containing a known bit sequence, RLS (Recursive Least Squares), SMI (Sample Matrix Inversion), is used.

Alternatively, for a part of reception slots that are determined to have good communication quality, of the multiple reception slots according to the slot diversity reception, the weight information calculator 336 may calculate weight information for the antenna elements 320-1 to 320-n by using the gain prioritized algorithm. The weight information calculator 336, for example, may calculate the weight information for the antenna elements 320-31 to 20-n, by using the gain prioritized algorithm for the reception slots having the best communication quality and using the interference suppression prioritized algorithm for other reception slots, of the multiple reception slots.

This enables transmitting signals and received signals containing identical data to be weighted by using the gain prioritized algorithm and the interference suppression prioritized algorithm that are in a trade-off relationship with each other. Note that, although gains include reception gains and transmission gains, here, gains related to signals received by the radio communication device 310 are referred to as reception gains of the radio communication device 310, and reception gains of the mobile station device 312 when the mobile station device 312 serving as a communication counterpart receives signals transmitted by the radio communication device 310 are referred to as transmission gains of the radio communication device 310.

The reception weighting unit 33S weights a received signal in each reception slot on the basis of the weight information of the antenna elements 320-1 to 320-n related to each reception slot that is calculated by the weight information calculator 336. To be specific, the reception weighting unit multiplies, respectively, the received-signals of the antenna elements 320-1 to 320-n related to each reception slot to be inputted from the radio receiver 330 by the weight information of the antenna elements 320-1 to 320-n related to each of the reception slots to be calculated by the weight information calculator 336, and outputs a signal obtained by adding up the multiplication results to the demodulator 344.

The transmission weighting unit 340 weights a transmitting signal in each transmission slot corresponding to each of the reception slots (having the same slot number) on the basis of the weight information of the antenna elements 320-1 to 320-n related to each reception slot that is calculated by the weight information calculator 336. To be specific, the transmission weighting unit 340 multiplies, respectively, the transmitting signal in each of the transmission slots to be inputted from the modulator 346 by the weight information of the antenna elements 320-1 to 320-n related to each of the reception slots that is calculated by the weight information calculator 336. The transmission weighting unit 340 supplies each signal that has been corrected on the basis of correction information stored in the antenna correction information storage 342, to the antenna elements 320-1 to 320-n.

The antenna correction information storage 342 is to store correction information (calibration coefficient) to be acquired from phase amplitude characteristics of the antenna elements 320-1 to 320-n and each of the radio transmitters 330.

The demodulator 344 demodulates a received signal from each mobile station device 312 that is to be inputted from the reception weighting unit 338 according to a predetermined demodulation method, and outputs the obtained base band received signal to the time divisional multiplex processor 348.

In addition, when received signals are received signals related to the slot diversity reception, the demodulator 344 receives, from the reception weighting unit 338, multiple received signals that have been weighted and synthesized by different algorithms. The demodulator 344 selects a received signal having the best reception characteristics from the weighted, synthesized multiple received signals, and performs the above demodulation process on the selected signal. Note that, the demodulator 344 may maximum ratio combine the multiple received signals, rather than selecting the received signal having the best reception characteristics.

The modulator 346 modulates a base band transmitting signal to be inputted from the time divisional multiplex processor 348 according to a predetermined modulation method, and outputs the modulated signal to the transmission weighting unit 34D.

The time divisional multiplex processor 348 has the function related to time division multiplexing, and inputs or outputs a data signal to be transmitted to/received from each of the mobile station devices 312 into/from a device of an upper layer (not shown). To be specific, the time divisional multiplex processor 348 separates and extracts a data signal from each mobile station device 312 from a base band received signal to be inputted from, the demodulator 344 and outputs it to the device of the upper layer. Further, the time divisional multiplex processor 348 stores data signals to each mobile station device 312 to be inputted from the device of the upper layer, in the transmission slot assigned to the communications with each of the mobile, station devices 312, and outputs the obtained base band transmitting signal to the modulator 346.
(Operation of Radio Communication Device)

Figure 13:
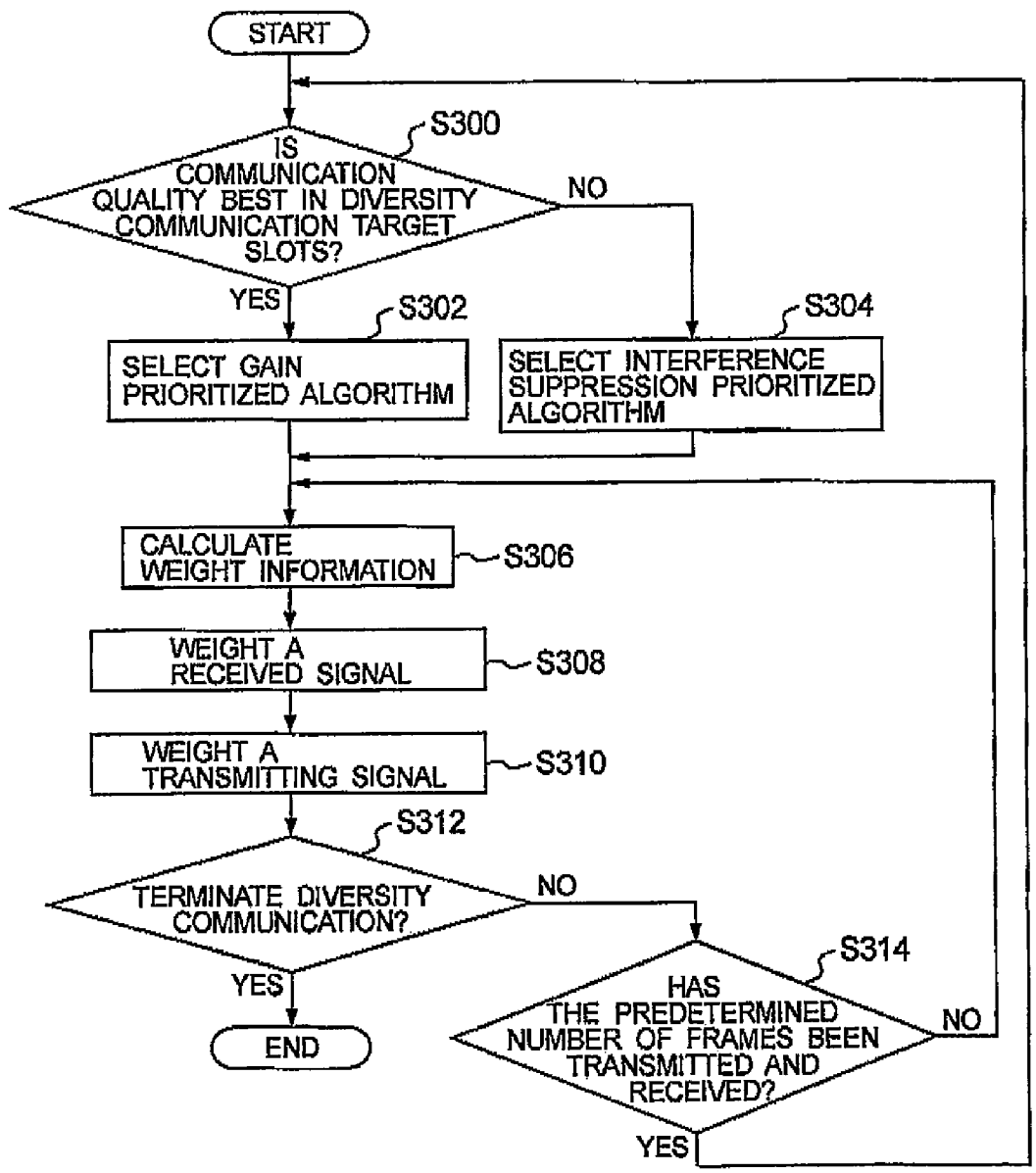
FIG. 13 is a flowchart showing an adaptive array process during slot diversity communications in the radio communication device according to the third embodiment of the present invention.

Here, the operation of the radio communication device 310 will be described. FIG. 13 is a flowchart showing the adaptive array process during the slot diversity communication in the radio communication device 310.

When the communication quality deteriorates or when traffic in the radio communication device 310 has been reduced, for example, the slot diversity communication is started by the determination of the radio communication device 310 or in response to a start request from the mobile station device 312.

When the slot diversity communication starts, the communication quality comparator 334 detects communication quality (for example, CIR) in each reception slot from received signals of the antenna elements 320-1 to 320-n to be inputted from the radio receiver 330. The communication quality comparator 334 determines whether or not the detected communication quality is the best of the multiple reception slots used in the slot diversity reception (S300), and outputs the determination result to the weight information calculator 336.

In S300, if it is determined that the communication quality is the best of the multiple reception slots, the weight information calculator 336 selects the gain prioritized algorithm as a weight information calculation algorithm to be applied to the reception slot (S302). In contrast, if it is determined that the communication quality is not the best of the multiple reception slots, the weight information calculator 336 selects the interference suppression prioritized algorithm as the weight information calculation algorithm to be applied to the reception slot (S304). Then, the weight information calculator 336 utilizes the algorithm selected in S302 or S304, calculates weight information of the antenna elements 320-1 to 320-n in the reception slot (S306), and outputs each calculated weight information piece to the reception weighting unit 338 and the transmission weighting unit 340, respectively.

Then, the reception weighting unit 338 multiplies, respectively, the received signals of the antenna elements 320-1 to 320-n related to each reception slot to be inputted from the radio receiver 330 by the weight information of the antenna elements 320-1 to 320-n related to each of the reception slots calculated by the weight information calculator 336 in S306, and outputs, to the demodulator 344, the signal obtained by adding the multiplication results (S308).

In addition, during the slot diversity transmission, the transmission weighting unit 340 multiplies the transmitting signal in each transmission slot corresponding to each reception slot inputted from the modulator 346 by the weight information of the antenna elements 320-1 to 320-n related to each of the reception slots calculated by the weight information calculator 336 in S306, respectively. Furthermore, the transmission weighting unit 340 respectively supplies, to the antenna elements 320-1 to 320-n, signals that have been corrected on the basis of the correction information stored in the antenna correction information storage 342 (S310).

Then, the radio communication device 310 determines whether or not to end the slot diversity communication (S312). The determination on whether or not to end the slot diversity communication is made depending on whether or not communication quality has improved, whether or not traffic has increased, whether or not a request for termination from the mobile station devices 312 has been received, and the like. In S312, if it is determined that the slot diversity communication is to be terminated, the radio communication device 310 terminates this process. On the other hand, in S312, if it is determined that the slot diversity communication also continues in a next TDMA frame, it is determined whether or not the number of TDMA frames transmitted and received after the communication quality has been compared last (S300) is equal to or greater than a predetermined number (S314).

In S314, if it is determined that the number of the TDMA frames transmitted and received is equal to or greater than the predetermined number, the communication quality comparator 334 compares the communication quality once again (S300). In contrast, if it is determined that the number of the TDMA frames transmitted and received is less than the predetermined number, the weight information calculator 336 uses the same algorithm as the algorithm selected in S302 or S304 to calculate the weight information of the antenna elements 320-1 to 320-n (S306).

(Operation/Effect)

According to the above embodiment, as weighting of received signals in multiple reception slots related to the slot diversity communication with the mobile station devices 312 and/or of transmitting signals in transmission slots corresponding to the reception slots by using not less than two algorithms having different effects is possible, a signal with better communication characteristics of the weighted multiple signals can be selected. Thus, the effect of improving communication characteristics can be further enhanced.

[Other Embodiments]

Note that, the present invention is not limited to the above embodiments, and various modifications can be made.

For example, in the first embodiment described above, although there are 2 mobile station devices 112, there may be not less than 3 mobile station devices 112. In this case, on the basis of reception power in the base station device 110 of reference signals to be transmitted respectively, a part (one or multiple) may be selected as a device A while others (one or multiple) may be selected as a device B. Then, weight to be used in communications with the device B may be calculated by the above algorithm 2 by directing a null to the arriving direction of a reference signal from the device A.

In addition, in the first embodiment described above, it is needless to say that weight to be calculated by the modem 118 may be used during reception as well as transmission.

In the third embodiment described above, the mobile communication system applying slot diversity communication is exemplified in which same carrier frequency is assigned to reception slots and transmission slots corresponding thereto (having a same slot number) in the Time Division Multiple Access scheme. However, the embodiment may also be applied to a mobile communication system, and the like that employs Frequency Division Multiple Access (FDMA) scheme that uses different carrier frequencies, Orthogonal Frequency Division Multiple Access (OFDMA) scheme that uses different sub-carrier frequencies, and Code Division Multiple Access (CDMA) scheme that uses different spread codes, as means for ensuring multiple different communication channels to be used in the diversity communication.

In the third embodiment described above, different carrier frequencies may be assigned to reception slots and transmission slots corresponding thereto. In such the mobile communication system, as different time intervals are respectively assigned to the transmission slots and the reception slots, predetermined application requirements will be further imposed in the following case. Specifically, if weight information calculation algorithm of each antenna related to the slot diversity transmission is determined on the basis of comparison result of communication quality related to received signals to be inputted from the communication quality comparator 334, it is necessary that a predetermined correlation in interference noise level in transmission and reception slots having a same slot number be observed (e.g., timing of an interference source is synchronized).

Further, in the third embodiment, it is needles to say that each weight information calculated by the weight information calculator 336 may be used only for any one of the weighting of the received signals in the reception weighting unit 338, or the weighting of the transmitting signal in the transmission weighting unit 340.

All of Japan Patent Application No. 2006-148720 (filed on May 29, 2006), Japan Patent Application No. 2006-148839 (filed on May 29, 2006), and Japan Patent Application No. 2006-206018 (filed on Jul. 28, 2006) have been incorporated by reference into this description.

Industrial Applicability

As has been described above, since a base station device, a method for controlling the base station device, a receiving device, an adaptation algorithm, control method, a radio communication device and a radio communication method according to the present invention can implement good communications in the adaptive array technology using an array antenna formed of multiple antenna elements, they are useful in radio communications such as mobile communications.

The invention claimed is:

1. A base station device which includes an array antenna, and which communicates with a plurality of mobile station devices including a first mobile station device and a second mobile station device in accordance with Space-Division Multiple Access scheme that uses the array antenna, the base station device comprising:
    a first weight calculator configured to calculate weight of each antenna element of the array antenna to be used in communications with the first mobile station device, by using a reference signal transmitted from the first mobile station device;
    a second weight calculator configured to calculate weight of each antenna element of the array antenna to be used in communications with the second mobile station device, so that null is directed to an arriving direction of the reference signal transmitted from the first mobile station device, wherein the second weight calculator determines the arriving direction of the reference signal transmitted from the first mobile station device on the basis of the weight calculated by the first weight calculator;
    an adaptive controller; and
    an antenna element number controller configured to control the number of antenna elements that receive a receiving wave, depending on whether the adaptive controller uses a spatial component suppressing type algorithm that suppresses spatial components in descending order of power among spatial components forming the receiving wave, wherein
    the adaptive controller uses the spatial component suppressing type algorithm when a ratio of a power level indicated by undesired wave power information to a power level indicated by desired wave power information is greater than a predetermined value, and
    the number of spatial components corresponds to the number of antenna elements that receive the receiving wave.

2. The base station device according to claim 1, further comprising:
    a reception power acquisition unit configured to acquire reception power of a signal transmitted from each of the mobile station devices; and
    a mobile station device selector configured to select the first mobile station device and the second mobile station device on the basis of each of the reception power acquired by the reception power acquisition unit.

3. The base station device according to any one of claims 1 and 2, further comprising:
    a third weight calculator configured to calculate weight of each antenna element of the array antenna to be used in communications with the second mobile station device, by using a reference signal transmitted from the second mobile station device,
    wherein the base station device communicates with the second mobile station device by using the weight calculated by the third weight calculator instead of the weight calculated by the second weight calculator, in accordance with quality of communications with the second mobile station device using the weight calculated by the second weight calculator.

4. A method for controlling a base station device which includes an array antenna and an adaptive controller, and which communicates with a plurality of mobile station devices including a first mobile station device and a second mobile station device in accordance with Space-Division Multiple Access scheme that uses the array antenna, the method comprising:
    a first weight calculation step of calculating weight of each antenna element of the array antenna to be used in communications with the first mobile station device, by using a reference signal transmitted from the first mobile station device;
    a second weight calculation step of calculating weight of each antenna element of the array antenna to be used in communications with the second mobile station device, the weight being calculated so that null is directed to an arriving direction of the reference signal transmitted from the first mobile station device, wherein the arriving direction of the reference signal transmitted from the first mobile station device is determined in the second weight calculation step on the basis of the weight calculated in the first weight calculation step; and
    an antenna element number controlling step to control a number of antenna elements that receive a receiving wave, depending on whether the adaptive controller uses a spatial component suppressing type algorithm that suppresses spatial components in descending order of power among spatial components forming the receiving wave, wherein
    the adaptive controller uses the spatial component suppressing type algorithm when a ratio of a power level indicated by undesired wave power information to a power level indicated by desired wave power information is greater than a predetermined value, and
    the number of spatial components corresponds to the number of antenna elements that receive the receiving wave.

5. A receiving device including an array antenna formed of a plurality of antenna elements, the device comprising:
    an adaptive controller configured to adaptively control a receiving wave arriving at each of the antenna elements by using a desired wave optimizing type adaptation algorithm as an adaptation algorithm, the desired wave optimizing type adaptation algorithm optimizing reception of a desired wave by utilizing a known signal;
    a desired wave power information acquisition unit configured to acquire desired wave power information indicating a power level of a desired wave from the receiving wave;
    an undesired wave power information acquisition unit configured to acquire undesired wave power information indicating a power level of an undesired wave contained in the receiving wave;
    a used adaptation algorithm changing unit configured to change the adaptation algorithm used by the adaptive controller to a spatial component suppressing type adaptation algorithm in accordance with the undesired wave power information and the desired wave power information, the spatial component suppressing type adaptation algorithm suppressing a spatial component forming the receiving wave in accordance with power of the spatial component when a ratio of the power level indicated by the undesired wave power information to a power level indicated by the desired wave power information is greater than a predetermined value; and
    an antenna element number controller configured to control a number of the antenna elements that receive the receiving wave, depending on whether the adaptive controller uses the spatial component suppressing type adaptation algorithm, wherein the spatial component suppressing type adaptation algorithm is an adaptation algorithm that suppresses spatial components in descending order of power among spatial components forming the receiving wave, the number of the spatial components corresponding to the number of the antenna elements that receive the receiving wave.

6. The receiving device according to claim 5, wherein the desired wave power information acquisition unit acquires the desired wave power information by using a desired wave optimized by the desired wave optimizing type adaptation algorithm.

7. The receiving device according to claim 5, wherein the desired wave power information acquisition unit acquires the desired wave power information by using the receiving wave arriving at each of the antenna elements.

8. The receiving device according to any one of claims 5 to 7, wherein
the special component suppressing type adaptation algorithm is an adaptation algorithm that suppresses a spatial component with the largest power, among spatial components forming the receiving wave, and
when a ratio of the power level indicated by the undesired wave power information to a power level indicated by the desired wave power information is greater than a predetermined value, the used adaptation algorithm changing unit causes the adaptive controller to use the spatial component suppressing type adaptation algorithm.

9. An adaptation algorithm control method for controlling an adaptation algorithm used in a receiving device including an array antenna formed of a plurality of antenna elements, the method comprising:
an adaptive control step of adaptively controlling a receiving wave arriving at each of the antenna elements by using a desired wave optimizing type adaptation algorithm that optimizes reception of a desired wave by utilizes a known signal;
a desired wave power information acquisition step of acquiring desired wave power information indicating a power level of a desired wave from the receiving wave;
an undesired wave power information acquisition step of acquiring undesired wave power information indicating a power level of an undesired wave contained in the receiving wave;
a used adaptation algorithm changing step of changing an adaptation algorithm used in the adaptive control step to a spatial component suppressing type adaptation algorithm in accordance with the undesired wave power information and the desired wave power information, the spatial component suppressing type adaptation algorithm suppressing a spatial component forming the receiving wave in accordance with power of the spatial component when a ratio of the power level indicated by the undesired wave power information to a power level indicated by the desired wave power information is greater than a predetermined value; and
an antenna element number control step of controlling a number of the antenna elements that receive the receiving wave, depending on whether the spatial component suppressing type adaptation algorithm is used in the adaptive control step, wherein
the spatial component suppressing type adaptation algorithm is an adaptation algorithm that suppresses spatial components in descending order of power among spatial components forming the receiving wave, the number of the spatial components corresponding to the number of the antenna elements that receive the receiving wave.

10. A radio communication device comprising:
an array antenna;
a communication quality comparator configured to compare a communication quality of a signal received in each of a plurality of communication channels;
a weight information calculator configured to calculate weight information of each antenna element of the array antenna for some of the plurality of communication channels by using a different algorithm from an algorithm used for other communication channels, on the basis of a comparison result by the communication quality comparator;
a weighting unit configured to weight at least one of a transmitting signal and a received signal at each of the plurality of communication channels, on the basis of the weight information of each antenna calculated by the weight information calculator;
an adaptive controller; and
an antenna element number controller configured to control a number of antenna elements that receive a receiving wave, depending on whether the adaptive controller uses a spatial component suppressing type algorithm that suppresses spatial components in descending order of power among spatial components forming the receiving wave, wherein
the adaptive controller uses the spatial component suppressing type algorithm when a ratio of a power level indicated by undesired wave power information to a power level indicated by desired wave power information is greater than a predetermined value,
the number of spatial components corresponds to the number of antenna elements that receive the receiving wave, and
the radio communication device communicates with a plurality of mobile station devices by using the array antenna, assigns the plurality of communication channels respectively to at least one of the mobile station devices, and performs diversity communication in the plurality of communication channels so that identical data pieces in the plurality of communication channels transmitted from the mobile station devices are respectively received at the plurality of communication channels.

11. The radio communication device according to claim 10, wherein the weight information calculator calculates weight information of each of the antennas for some communication channels that are determined to have good communication quality by the communication quality comparator among the plurality of communication channels, the weight information being calculated by using a gain prioritized algorithm.

12. The radio communication device according to claim 10, wherein the communication channels are formed of transmission channels and reception channels that use the same carrier frequency.

13. The radio communication device according to any one of claims 10 to 12, wherein
the radio communication device communicates with the plurality of mobile station devices in accordance with the Time Division Multiple Access scheme, and
the communication channels are formed of transmission channels and reception channels that use different time division slots.

14. A radio communication method for communicating with a plurality of mobile station devices by using an array antenna and an adaptive controller, the method comprising:

an assigning step of assigning a plurality of communication channels respectively to at least one of the mobile station devices;

a performing step of performing diversity communication in the plurality of communication channels so that identical data pieces in the plurality of communication channels transmitted from the mobile station devices are respectively received at the plurality of communication channels;

a communication quality comparison step of comparing communication quality of a signal received in each of the plurality of communication channels;

a weight information calculation step of calculating weight information of each antenna element of the array antenna for some of the plurality of communication channels by using a different algorithm from an algorithm used for other communication channels, on the basis of a comparison result in the communication quality comparison step;

a weighting step of weighing at least one of a transmitting signal and a received signal at each of the plurality of communication channels, on the basis of the weight information of each antenna calculated in the weight information calculation step; and an antenna element number controlling step to control a number of antenna elements that receive a receiving wave, depending on whether the adaptive controller uses a spatial component suppressing type algorithm that suppresses spatial components in descending order of power among spatial components forming the receiving wave, wherein the adaptive controller uses the spatial component suppressing type algorithm when a ratio of a power level indicated by undesired wave power information to a power level indicated by desired wave power information is greater than a predetermined value, and the number of spatial components corresponds to the number of antenna elements that receive the receiving wave.

* * * * *